March 23, 1948. P. A. CHAMBERLAIN 2,438,386
BUNDLE BINDING MACHINE
Filed July 12, 1945 23 Sheets-Sheet 1
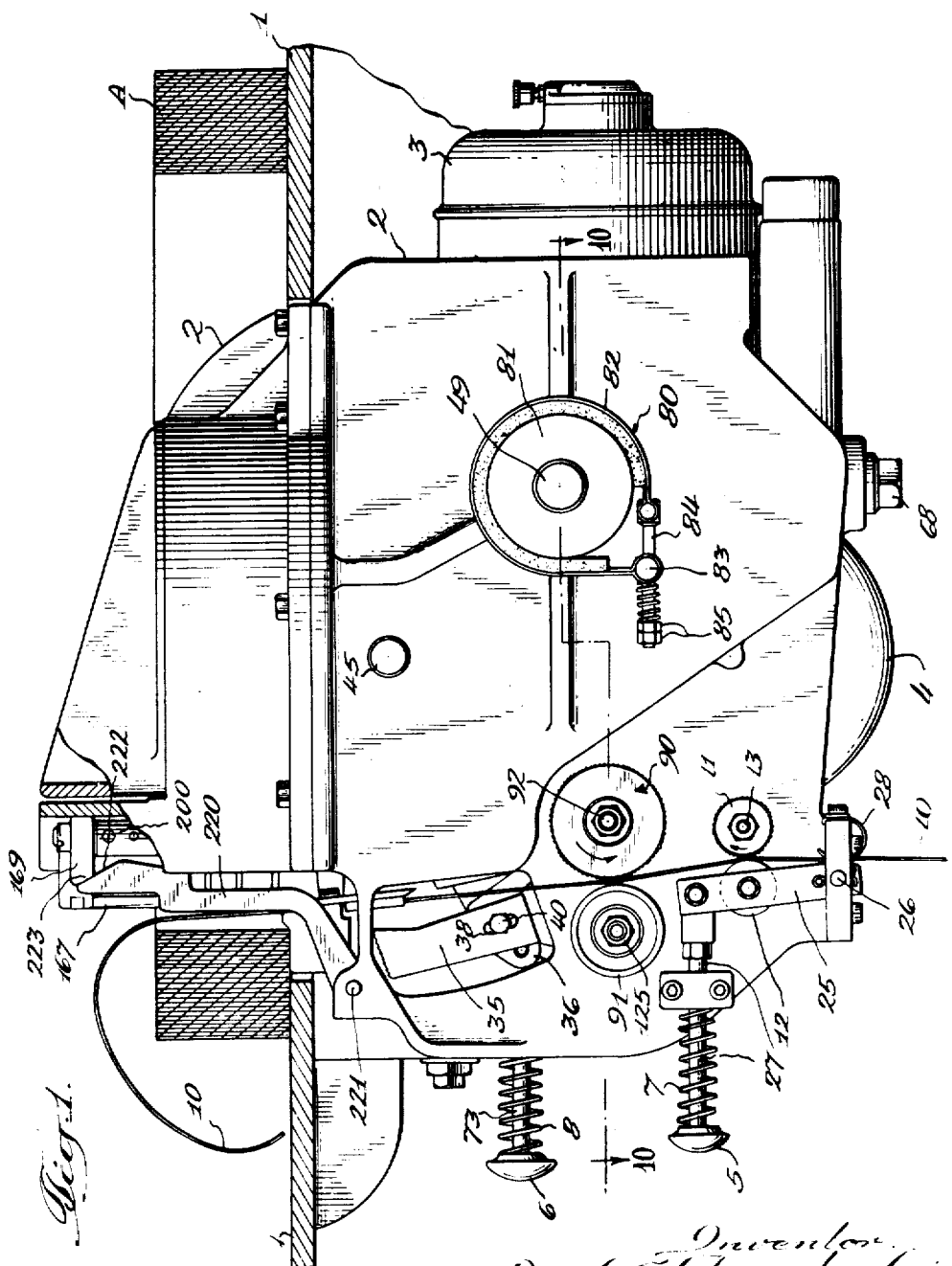

March 23, 1948. P. A. CHAMBERLAIN 2,438,386
BUNDLE BINDING MACHINE
Filed July 12, 1945 23 Sheets-Sheet 2
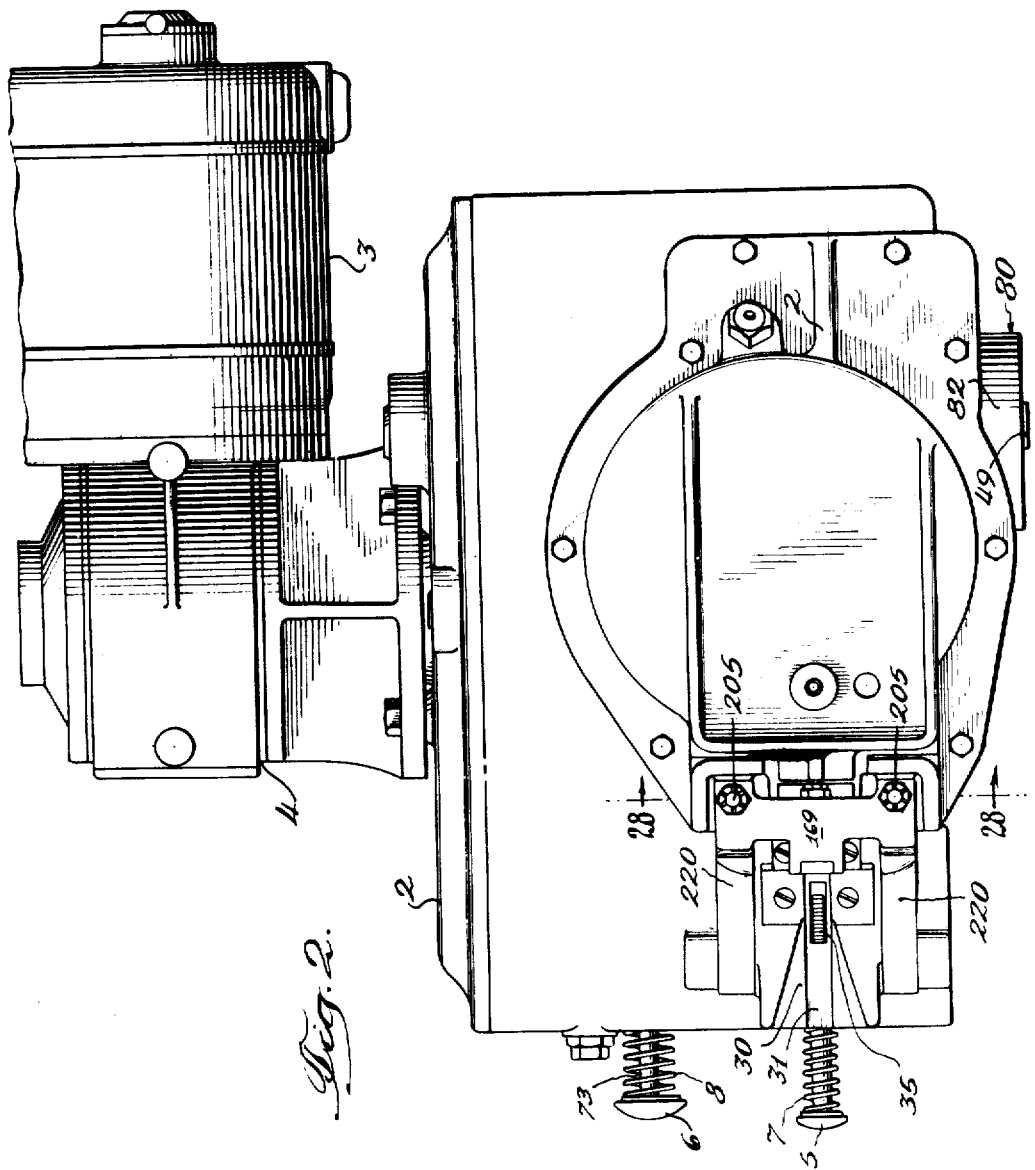

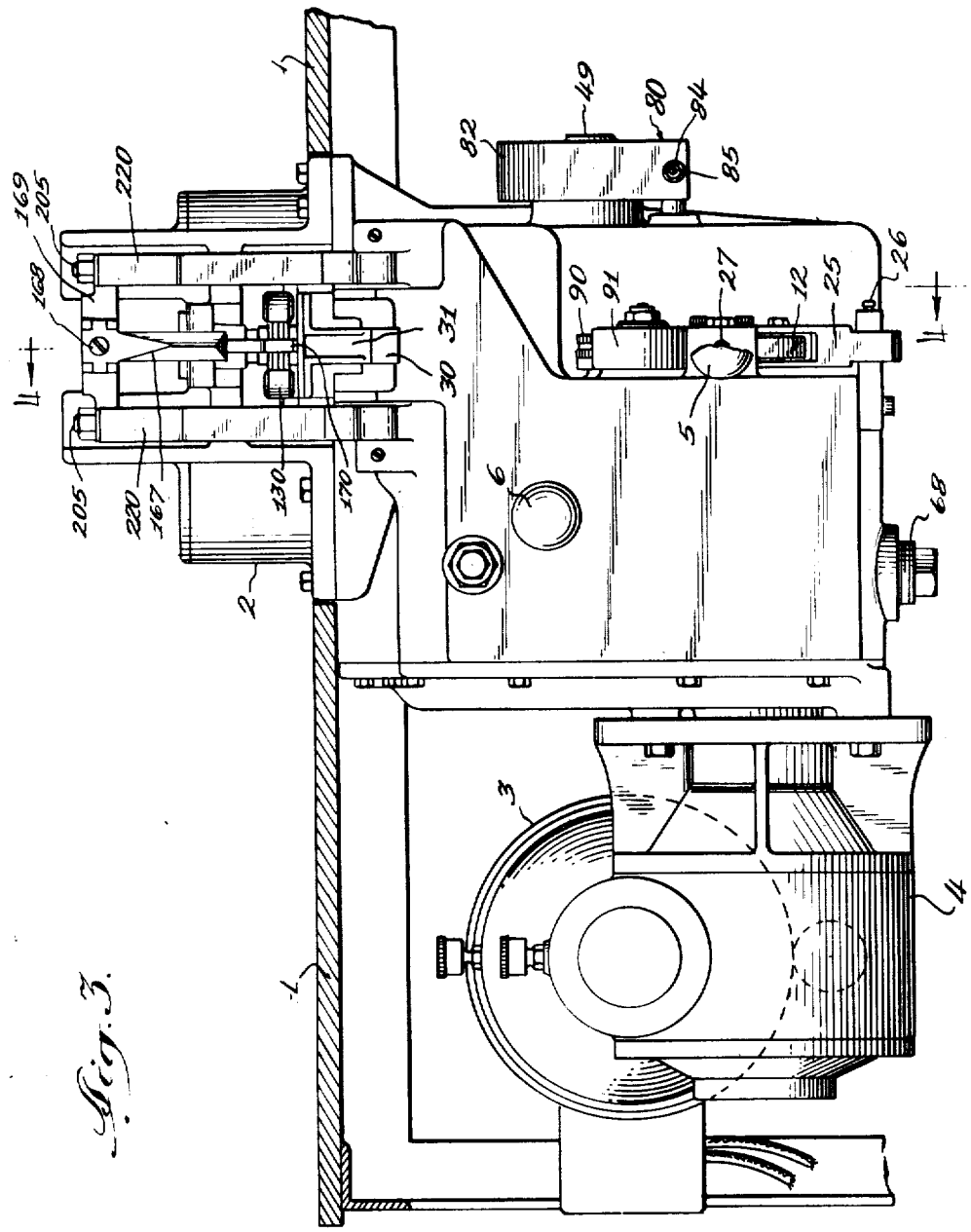

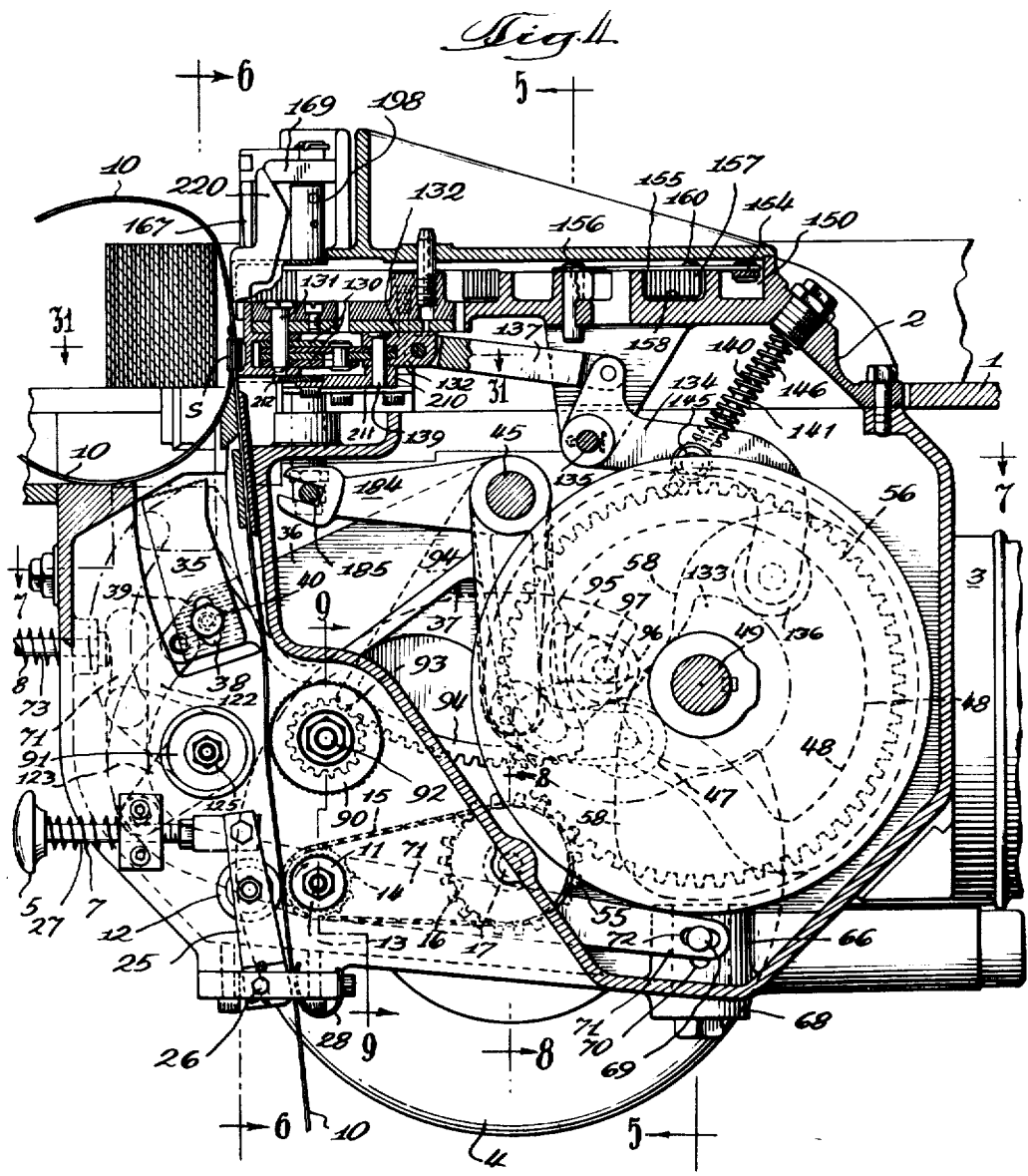

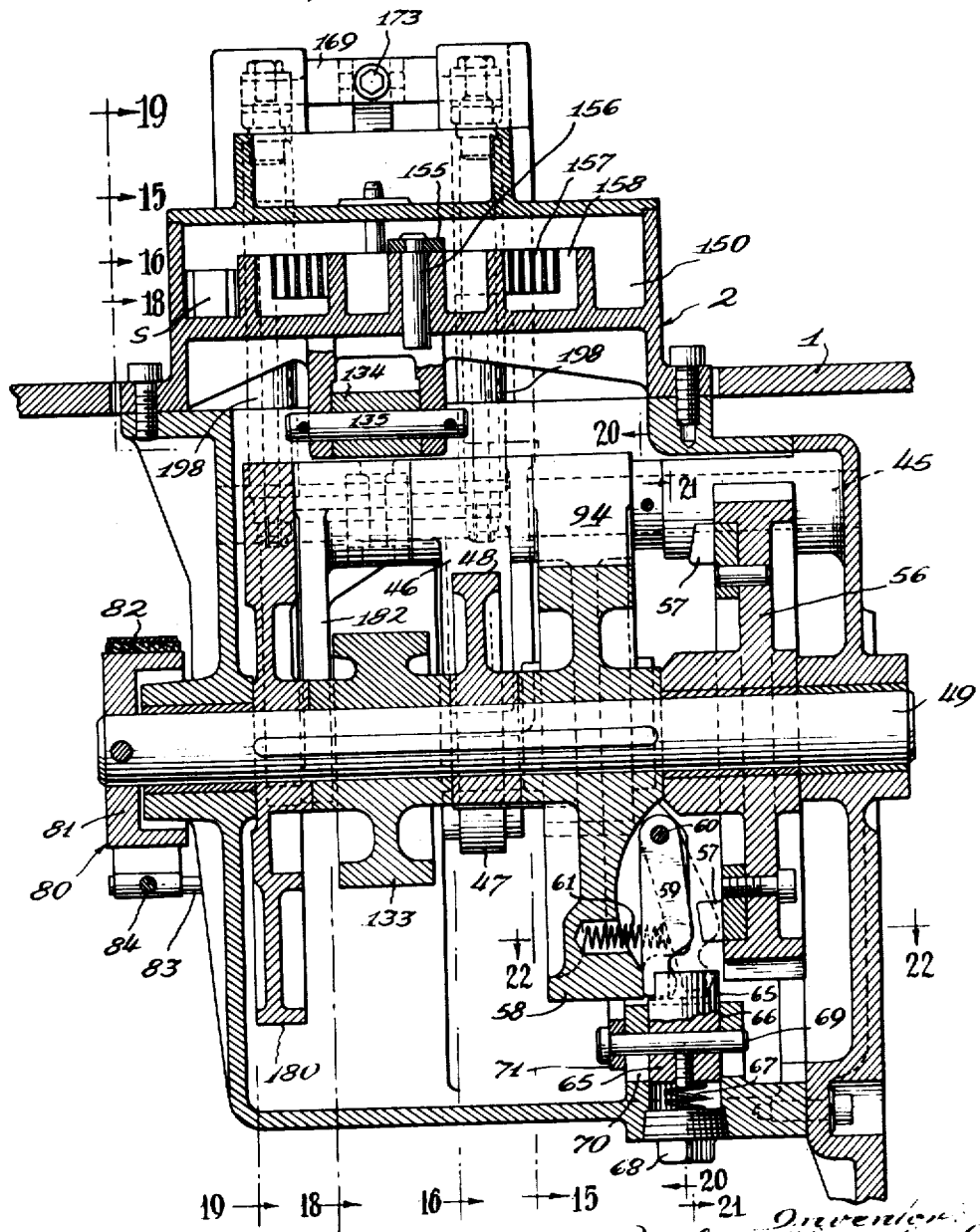

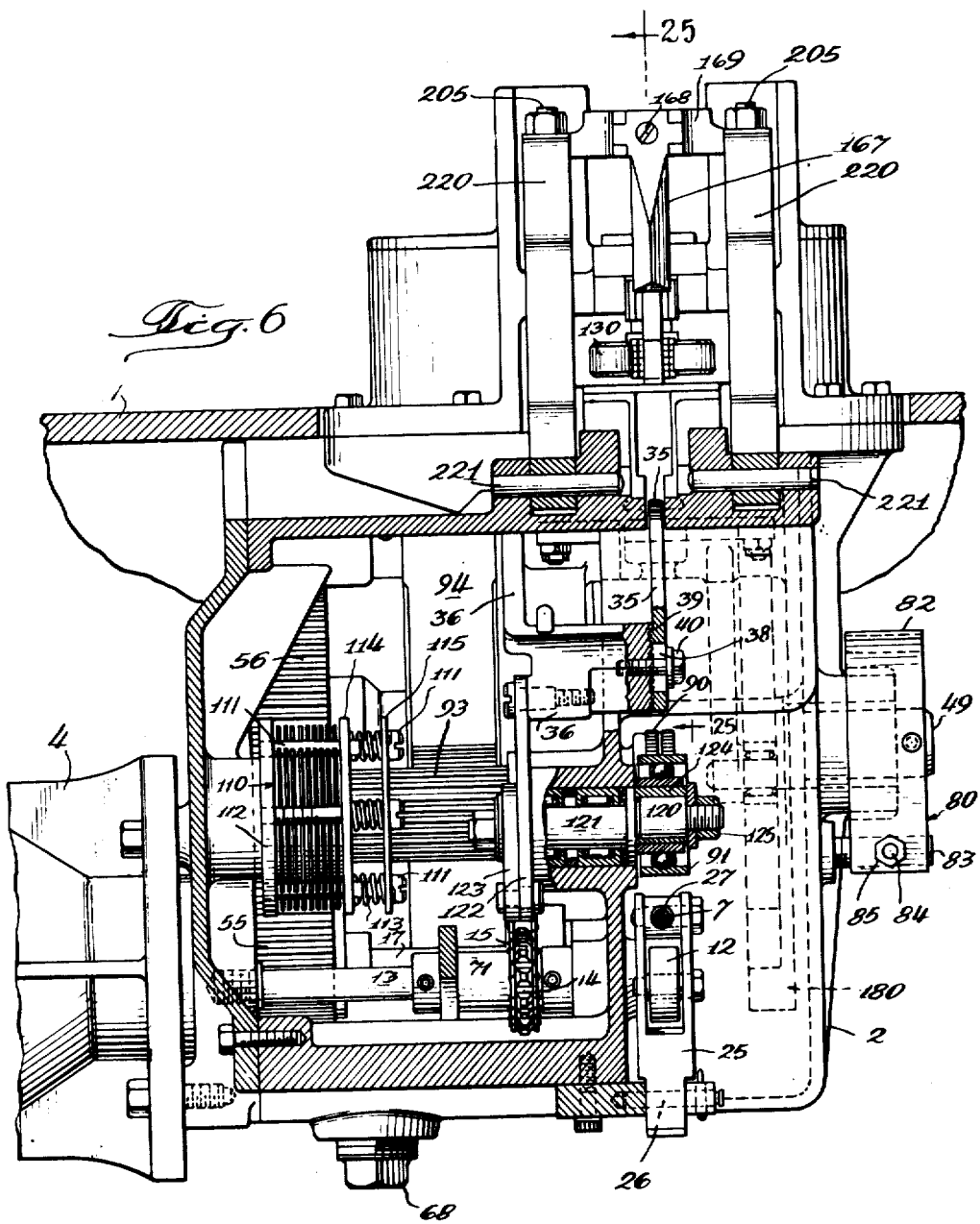

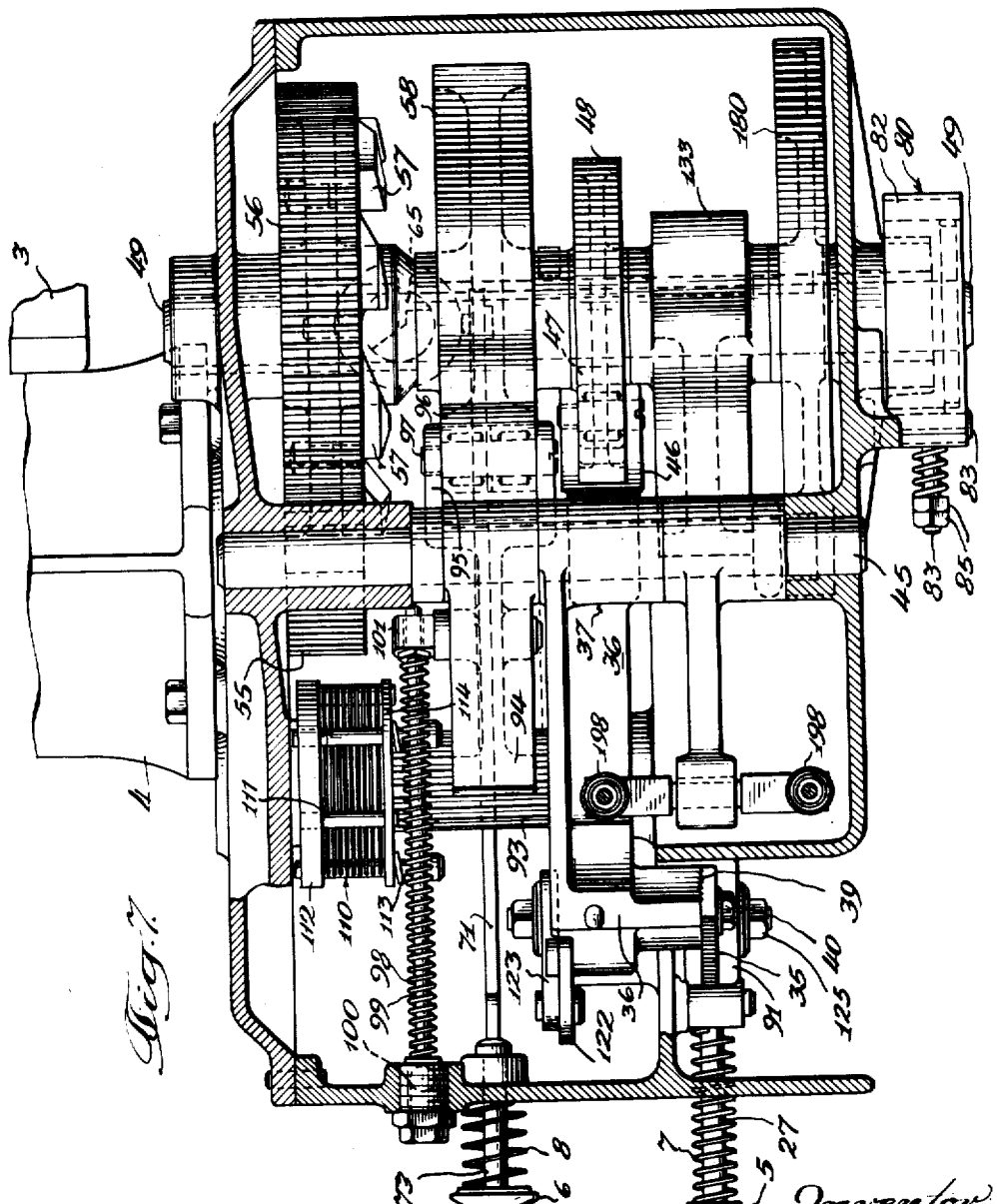

March 23, 1948. P. A. CHAMBERLAIN 2,438,386
BUNDLE BINDING MACHINE
Filed July 12, 1945 23 Sheets-Sheet 8
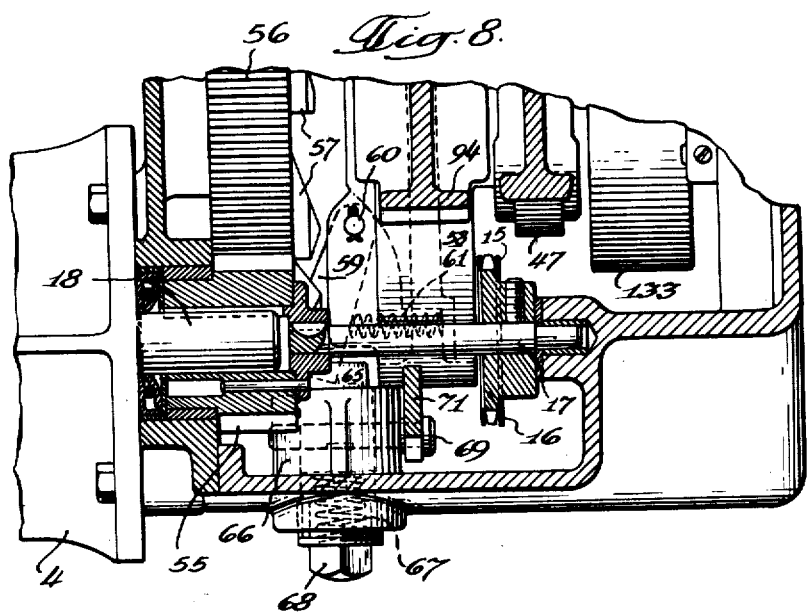
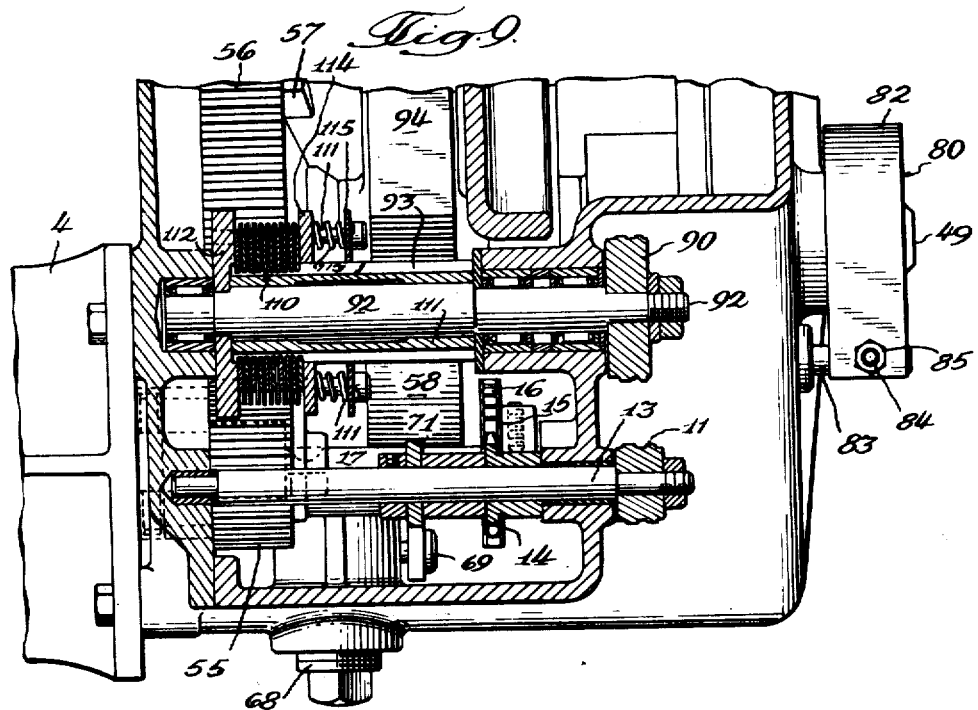

March 23, 1948. P. A. CHAMBERLAIN 2,438,386
BUNDLE BINDING MACHINE
Filed July 12, 1945 23 Sheets-Sheet 9
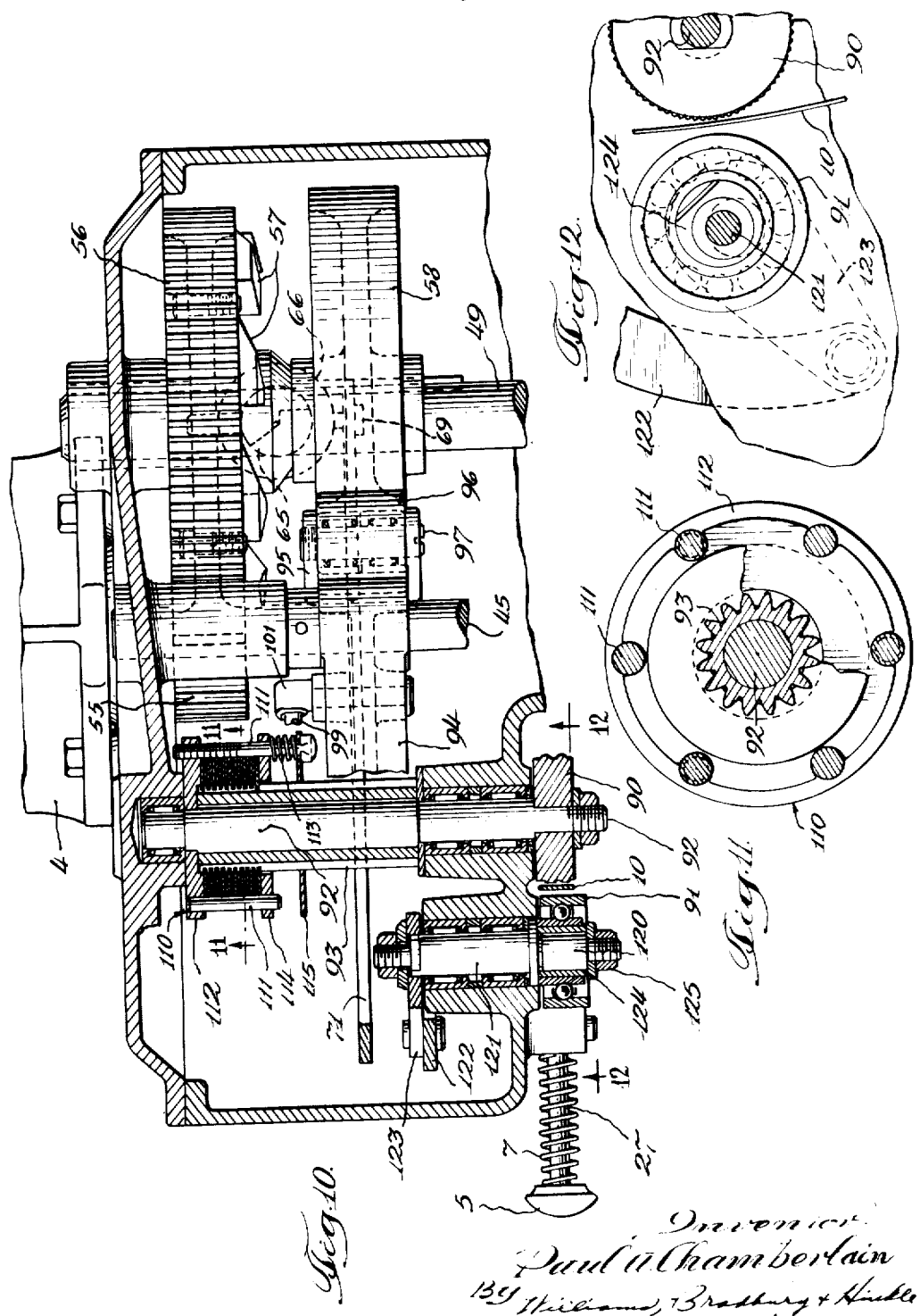

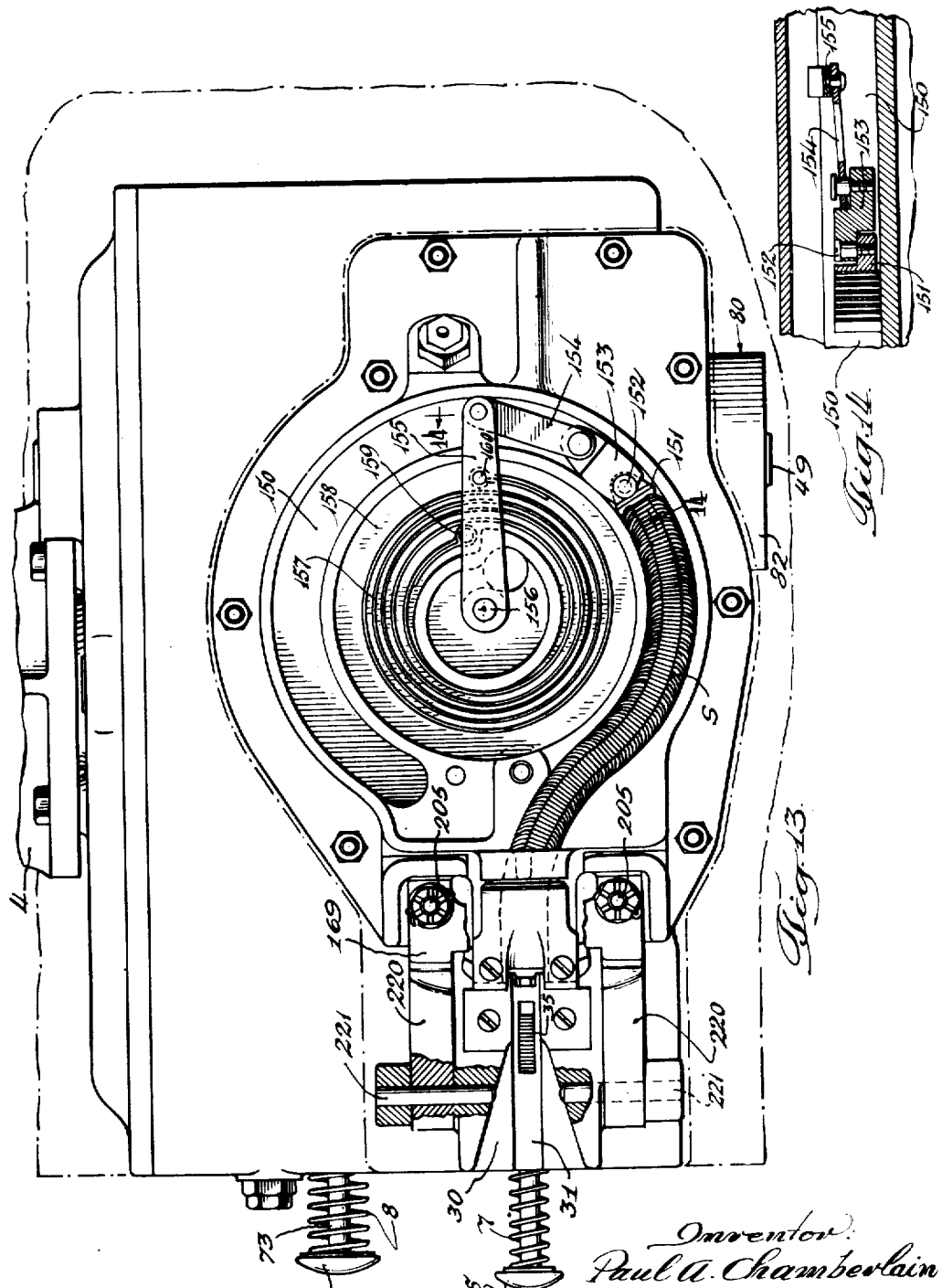

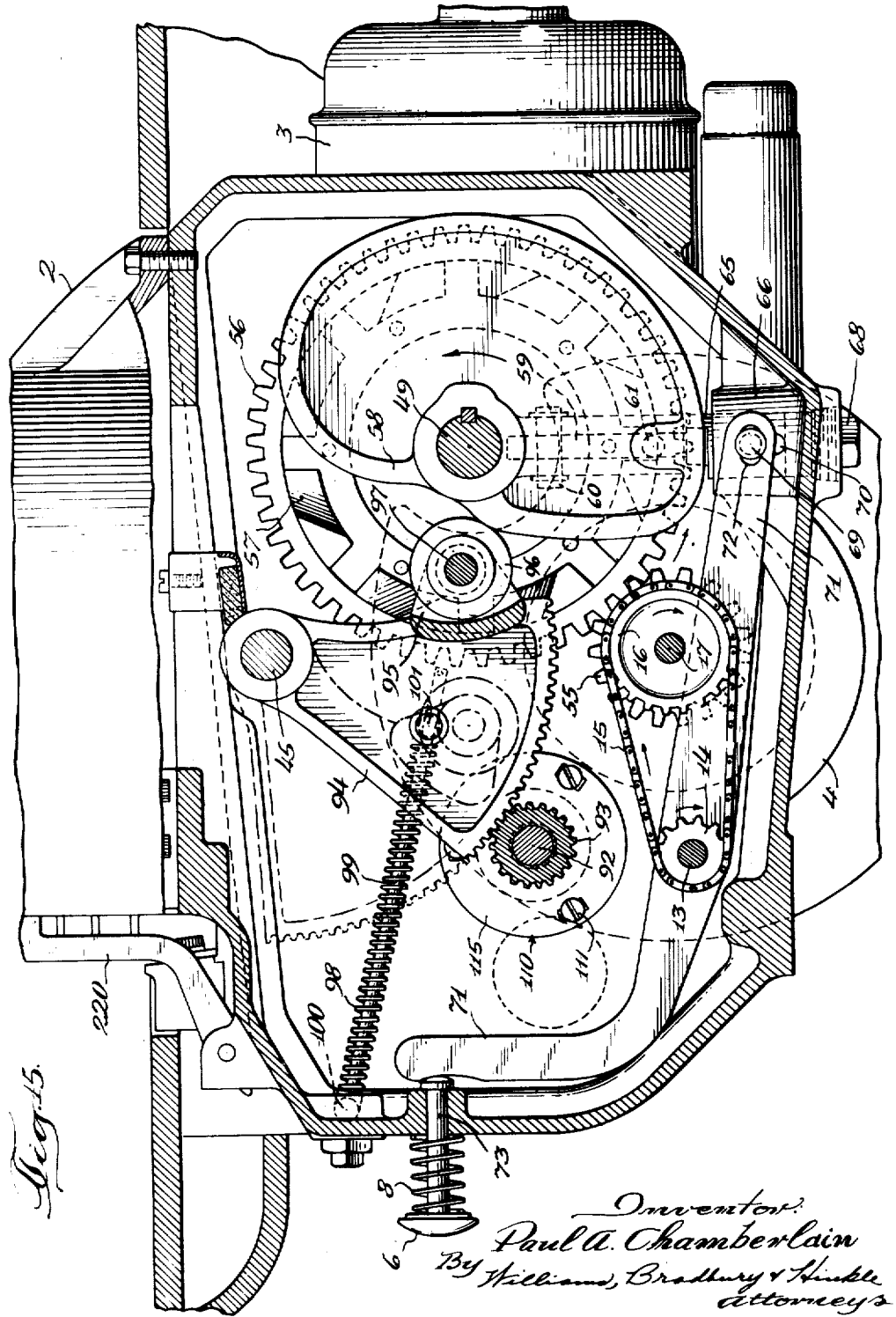

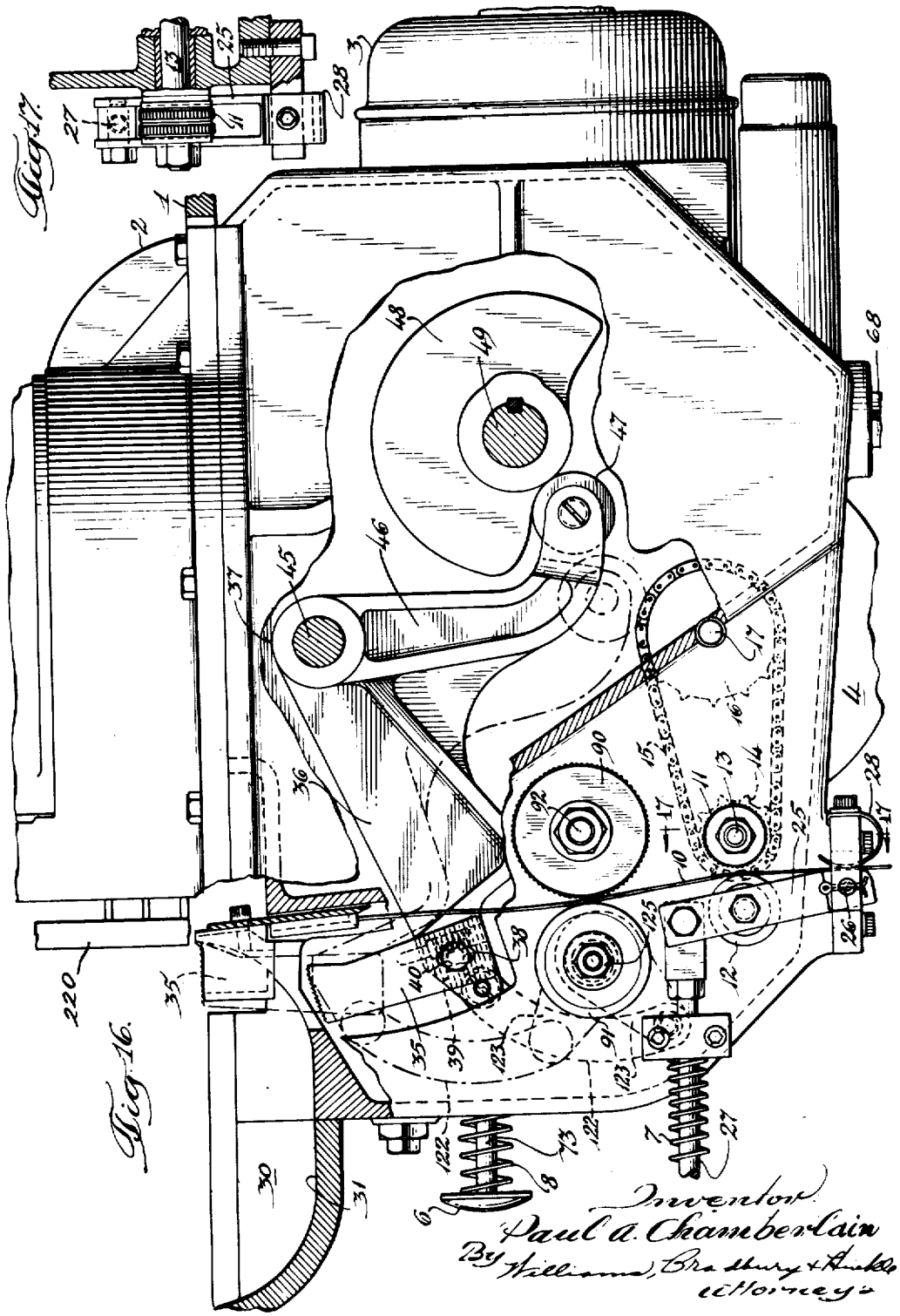

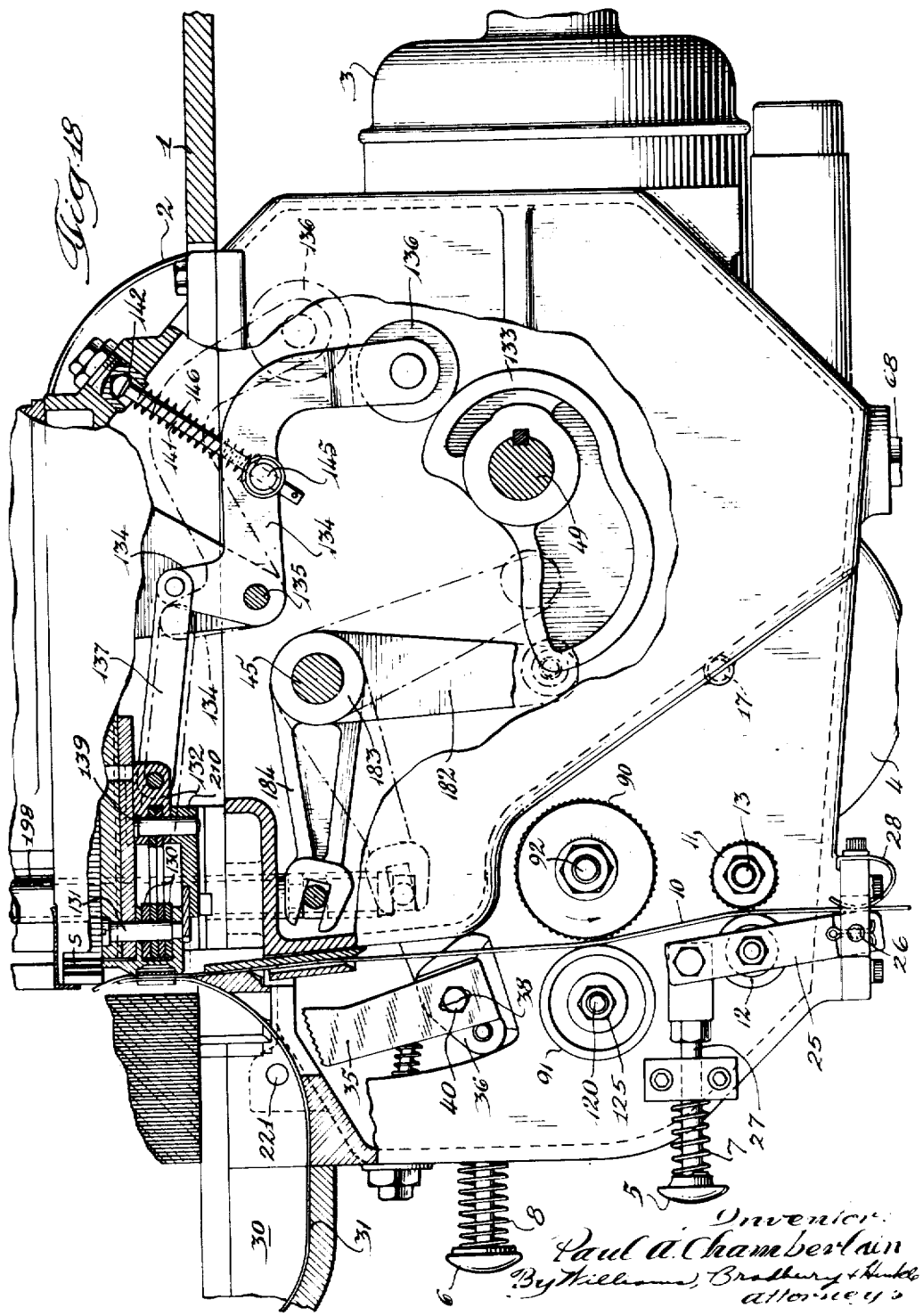

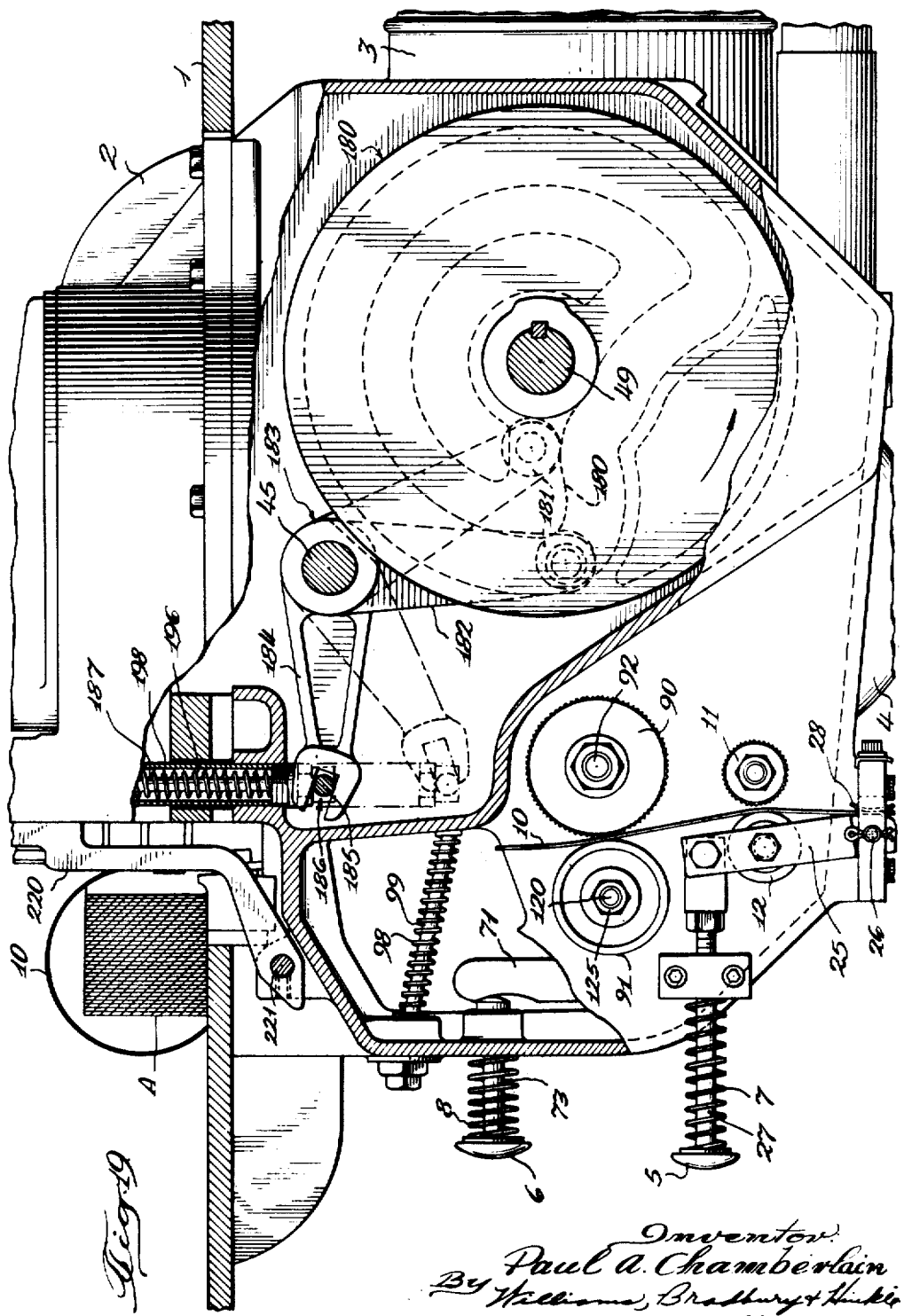

March 23, 1948.  P. A. CHAMBERLAIN  2,438,386
BUNDLE BINDING MACHINE
Filed July 12, 1945  23 Sheets-Sheet 15
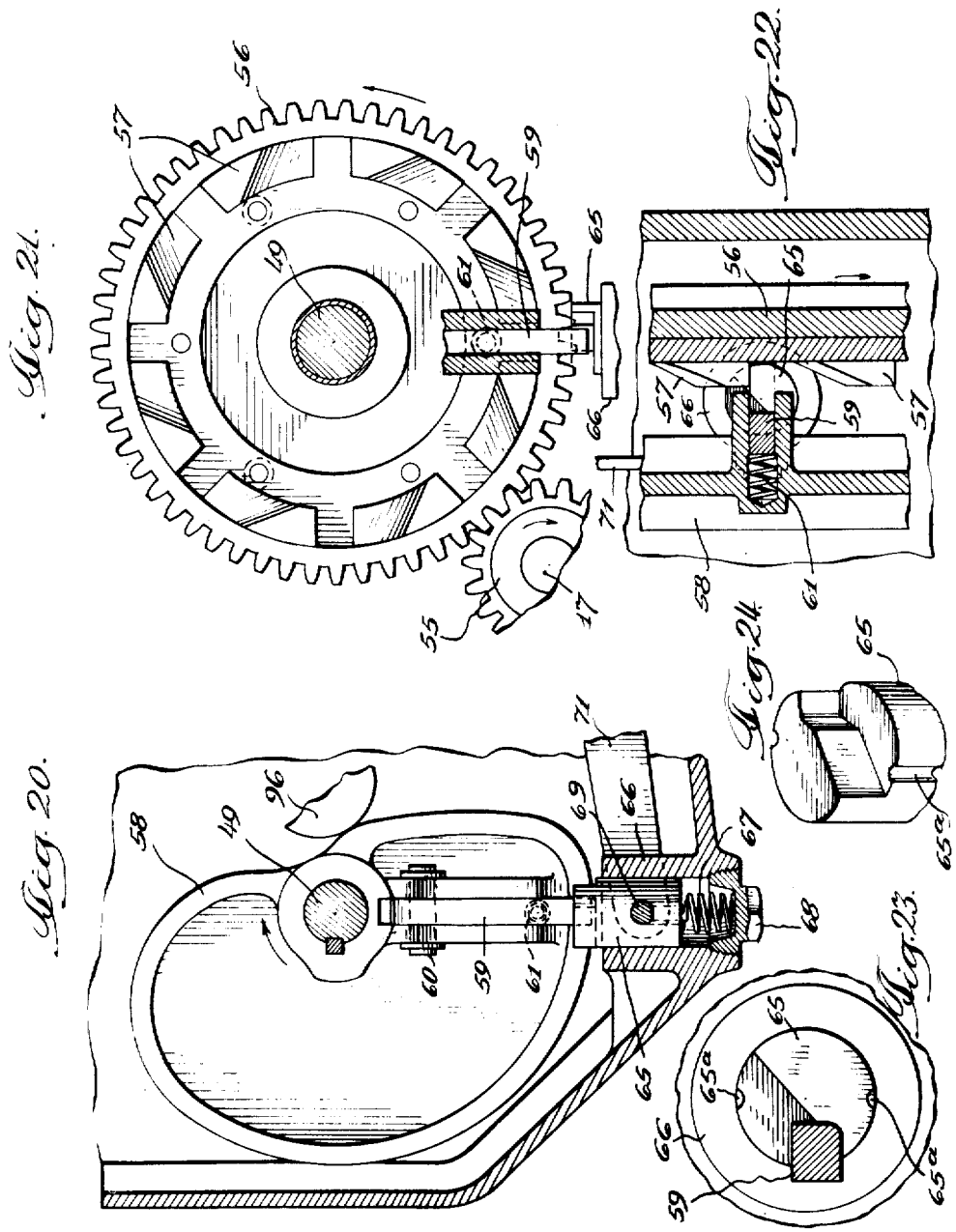
Inventor
Paul A. Chamberlain
By Williams, Bradbury & Hinkle
Attorneys

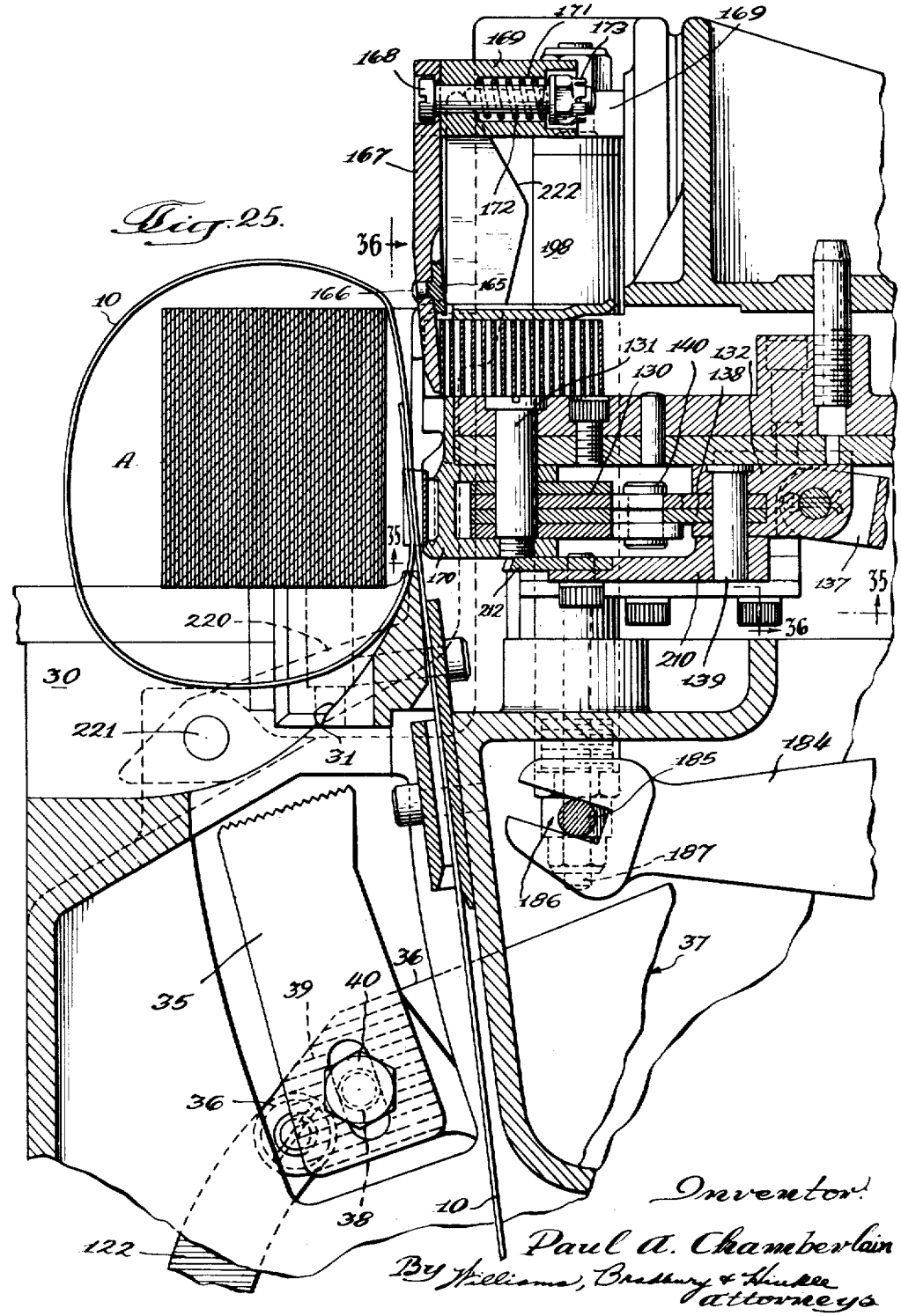

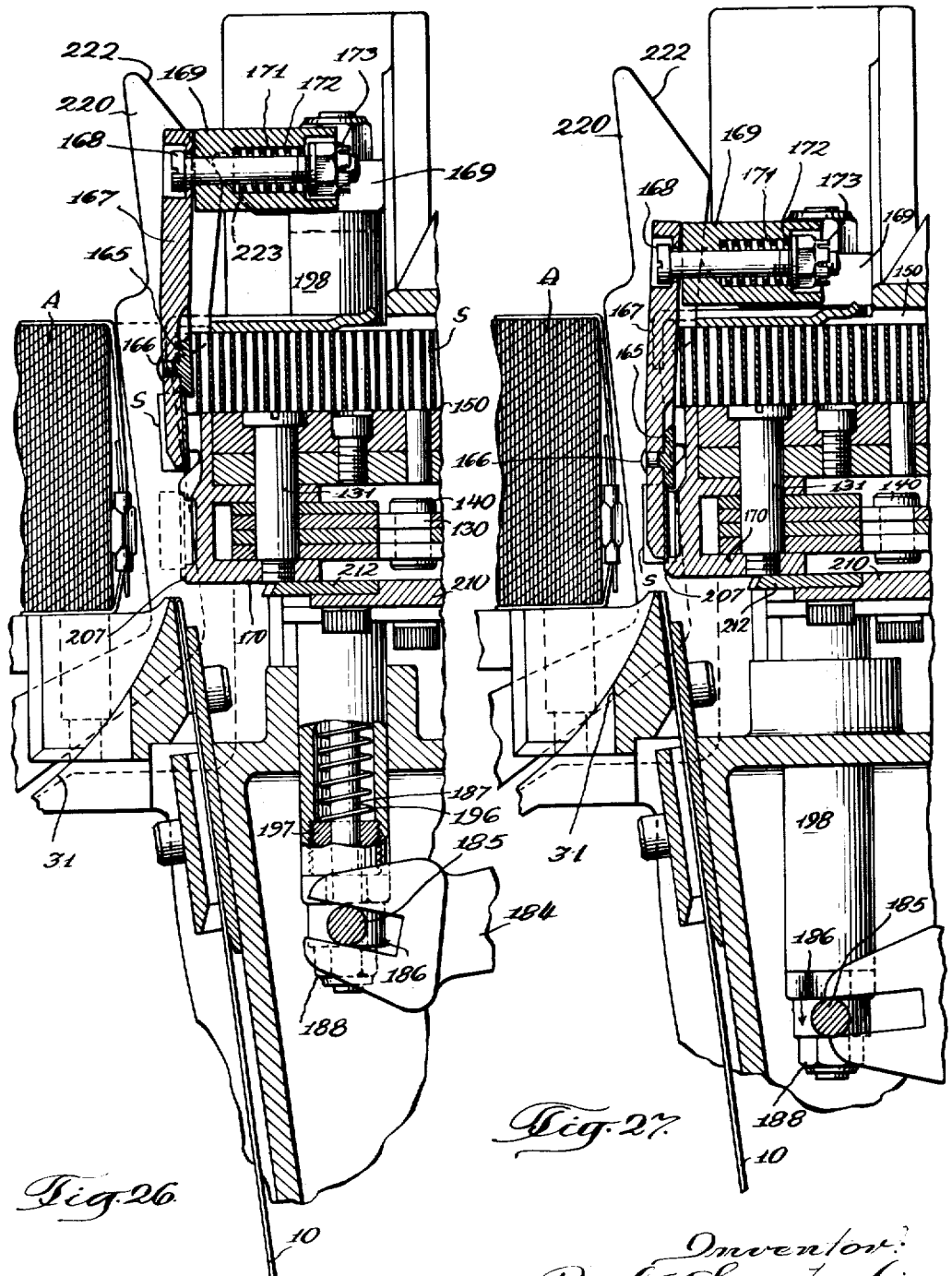

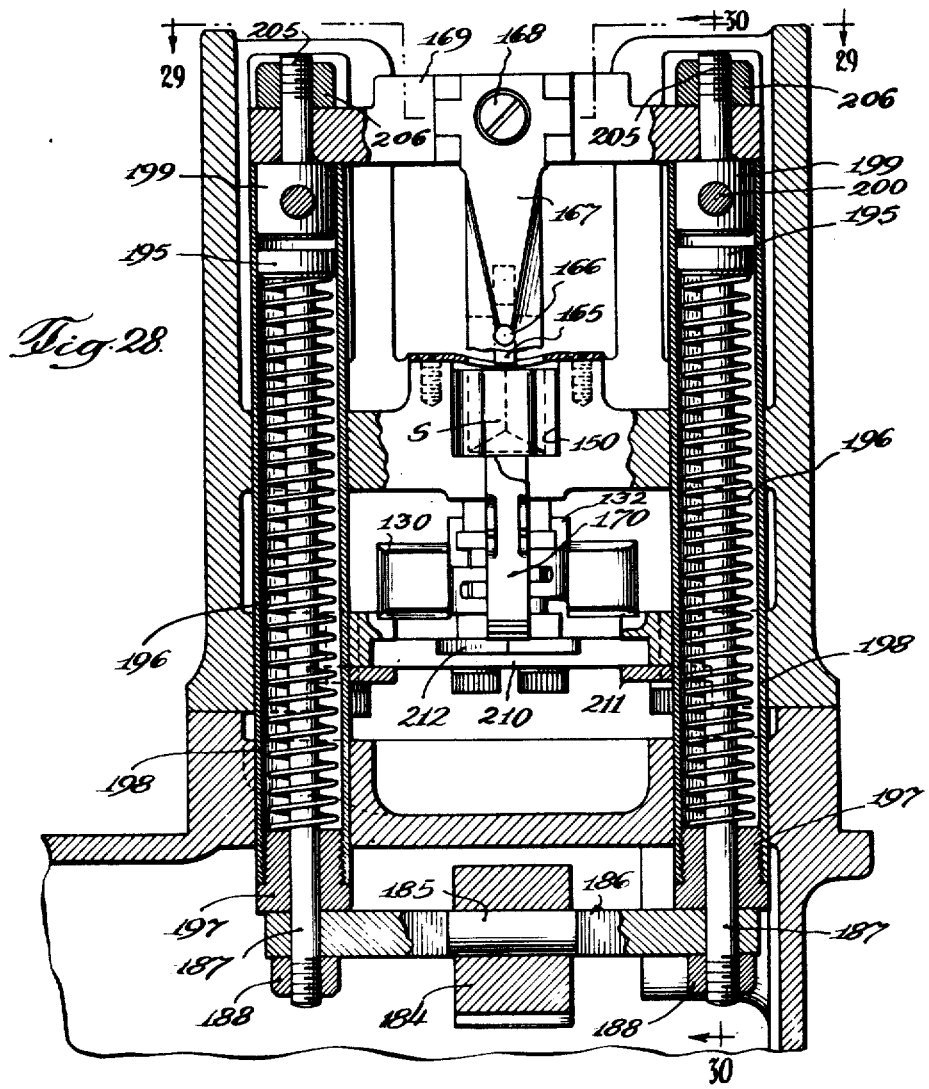
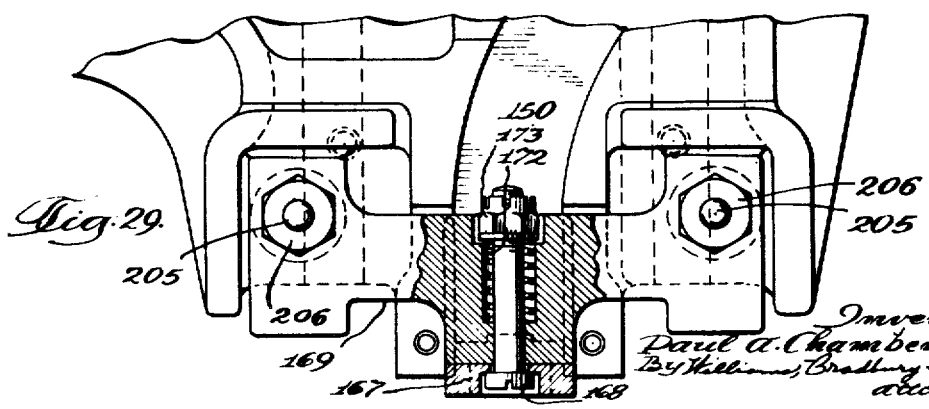

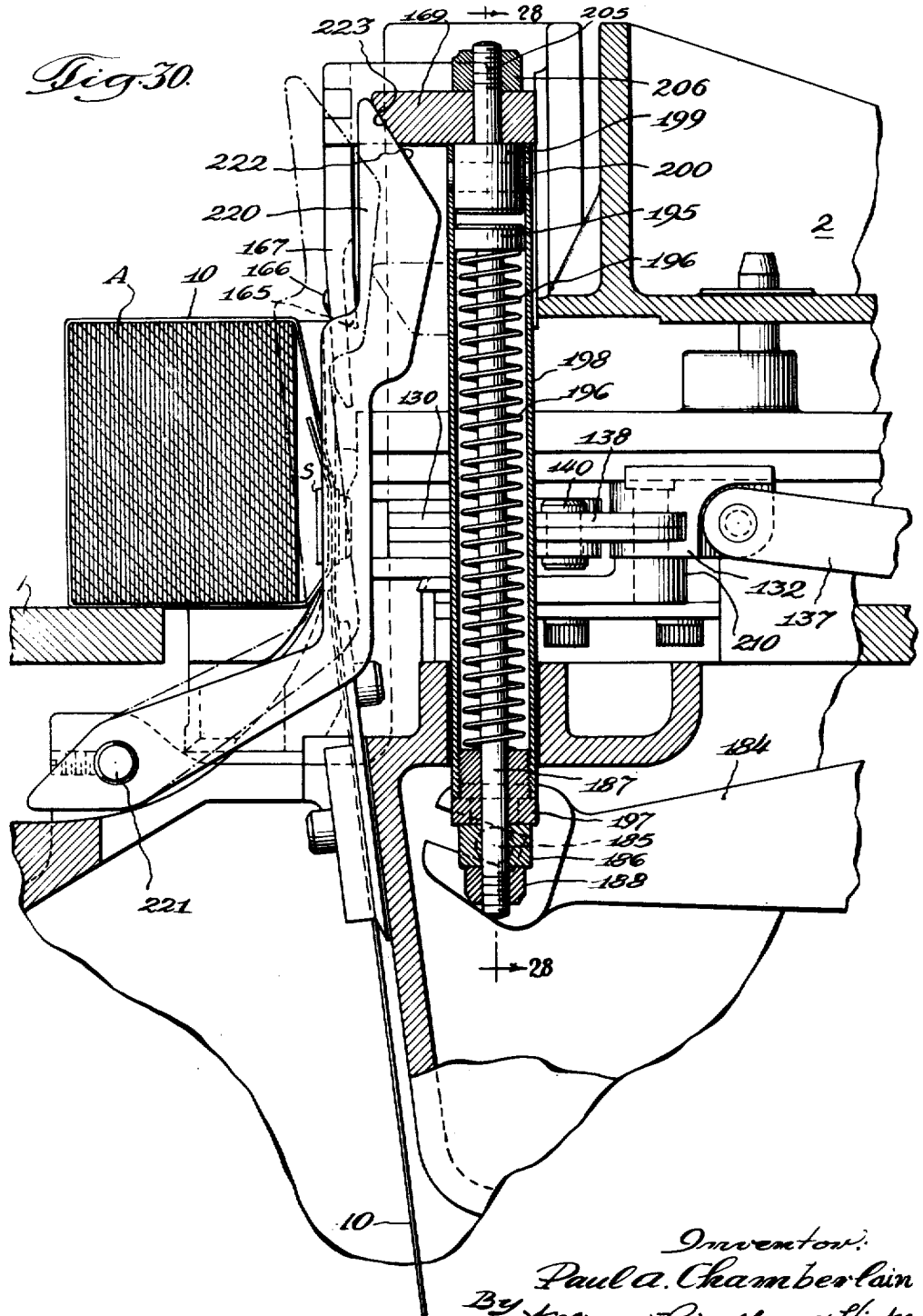

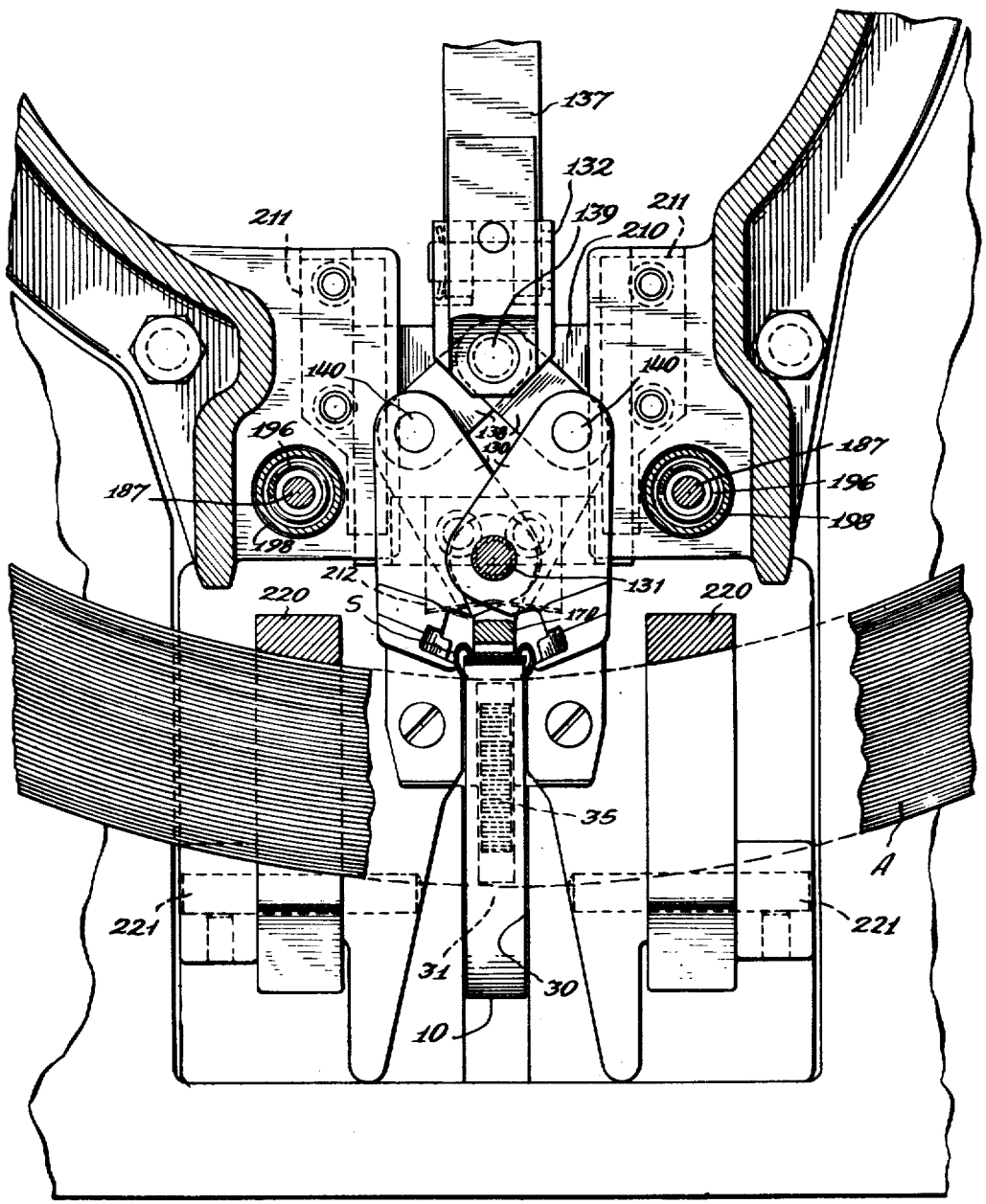

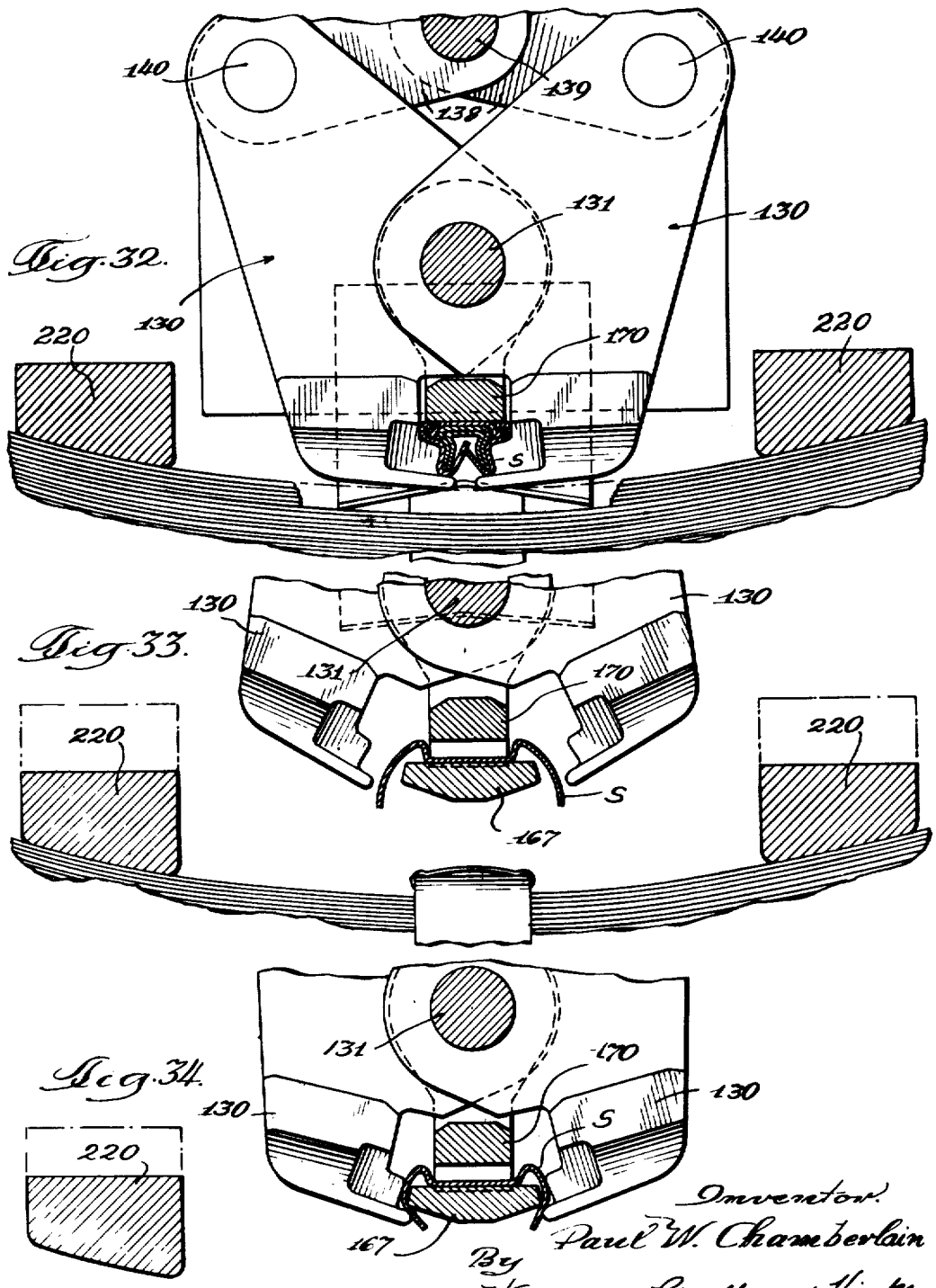

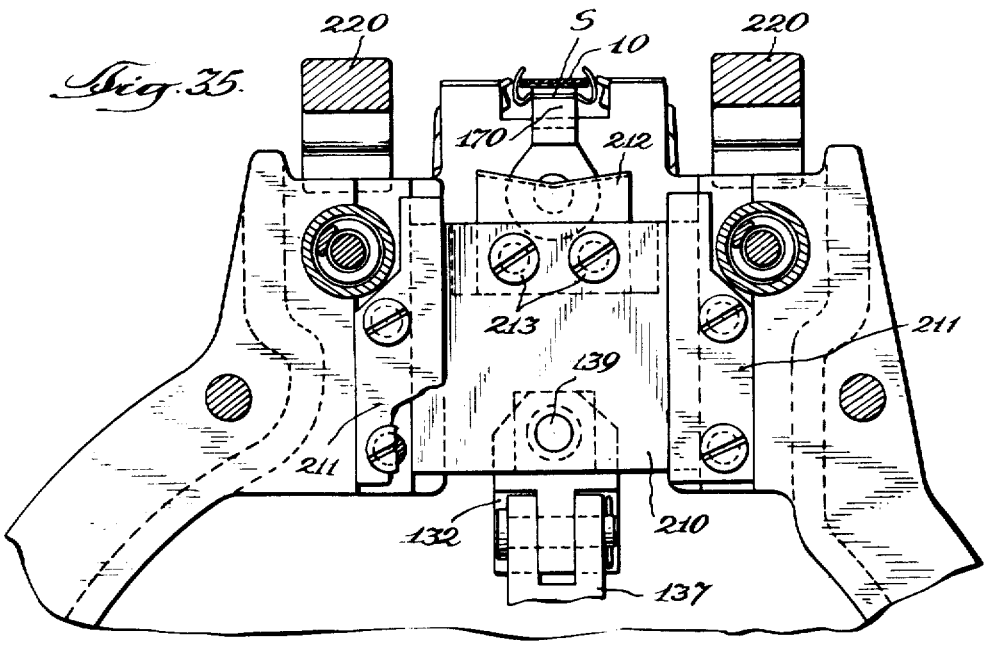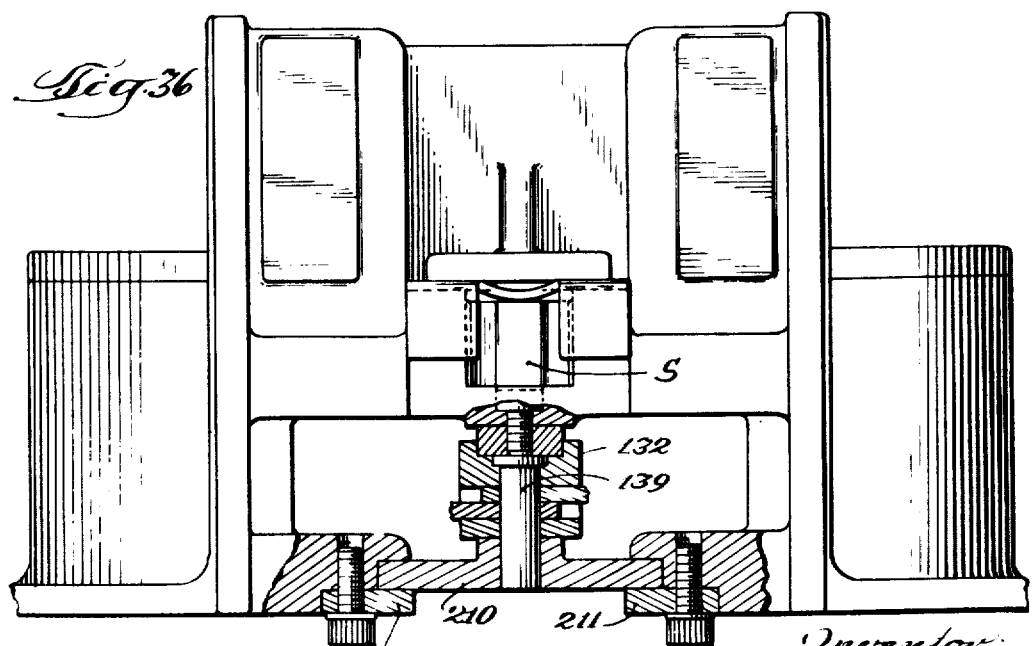

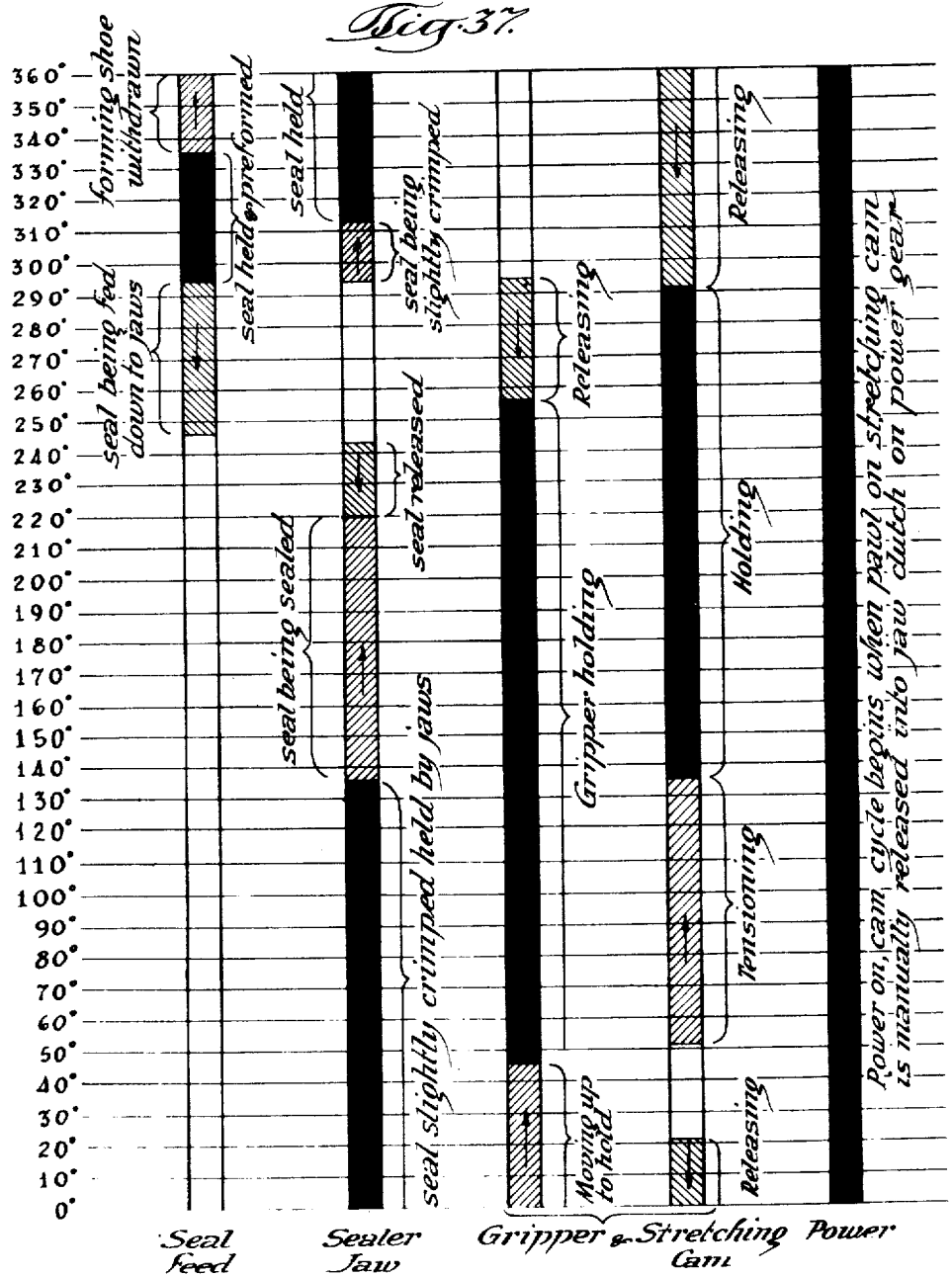

Patented Mar. 23, 1948

2,438,386

UNITED STATES PATENT OFFICE 2,438,386

BUNDLE BINDING MACHINE

Paul A. Chamberlain, Chicago, Ill., assignor to Signode Steel Strapping Company, Chicago, Ill., a corporation of Delaware Application July 12, 1945, Serial No. 604,615

10 Claims. (Cl. 100—31)

My invention relates to bundle-binding machines.

It relates more particularly to a machine including a support, such as a bench or table, for a bundle to be encircled and bound by tensioned binder and mechanism for feeding desired—but not fixed—lengths of the binder as required, for facilitating the operator's encirclement of the bundle by the binder to form a tight loop thereabout with overlapping ends which may be joined to render the encircling loop permanent, for feeding a joint-sleeve or seal from a magazine to the region where the overlapping binder ends are to be joined, for retracting excess length of binder and thereby shrink the loop until it tightly encircles and binds the bundle, for cutting the loop from the source of binder supply, for joining the overlapping loop ends and seal into a seal-joint to render the bundle encircling loop permanent, and for moving the bundle out of binding position, all of these operations except the encirclement or looping of the bundle by the binder being accomplished by power under the control of but not derived from the operator.

The principal object of my invention is to provide a machine for accomplishing the result set forth above.

Another object is to provide a machine which will result in the bundle being tightly encircled by the permanent loop of binder.

A further object is to provide a machine whereby the initially anchored end of the binder loop is gripped against the bundle being bound so as to reduce the number of grippers and lessen the slack in the finished or permanent loop.

Another object is to provide a machine wherein the tensioning of the loop about the bundle, the feeding of the joint seals, the cutting off of the binder loop from the source of supply, the making of the seal-joint and the movement of the bound bundle out of binding position take place automatically and in proper sequence merely upon the operator actuating a control handle.

Other objects and advantages will hereinafter appear.

In the accompanying drawings,

Fig. 1 is a side elevation of the machine;

Fig. 2 is a top plan;

Fig. 3 is a front elevation;

Fig. 4 is a section on the line 4—4 of Fig. 3, showing particularly the operating cams and seal feeding mechanism;

Fig. 5 is a section on the line 5—5 of Fig. 4;
Fig. 6 is a section on the line 6—6 of Fig. 4;
Fig. 7 is a section on the line 7—7 of Fig. 4;
Fig. 8 is a section on the line 8—8 of Fig. 4;
Fig. 9 is a section on the line 9—9 of Fig. 4;
Fig. 10 is a horizontal section on the line 10—10 of Fig. 1;

Fig. 11 is a section on the line 11—11 of Fig. 10;

Fig. 12 is a section on the line 12—12 of Fig. 10;

Fig. 13 is a top plan of the seal magazine with cover removed to show the details of the seal supplying mechanism;

Fig. 14 is a section on the line 14—14 of Fig. 13;

Fig. 15 is a section on the line 15—15 of Fig. 5 showing particularly the cam and follower for effecting the retraction and tensioning of the binder to produce tension in the binder encircling loop;

Fig. 16 is a section on the line 16—16 of Fig. 5, showing particularly the binder anchoring gripper and its actuating mechanism;

Fig. 17 is a section on the line 17—17 of Fig. 16;

Fig. 18 is a section on the line 18—18 of Fig. 5;

Fig. 19 is a section on the line 19—19 of Fig. 5, showing particularly the seal feed cam and follower;

Fig. 20 is a section on the line 20—20 of Fig. 5;
Fig. 21 is a section on the line 21—21 of Fig. 5;
Fig. 22 is a section on the line 22—22 of Fig. 5;

Fig. 23 is an enlarged detail cross section of the driving latch through which power is communicated to the cam shaft;

Fig. 24 is a perspective of the latching plug;
Fig. 25 is a section on the line 25—25 of Fig. 6;

Fig. 26 is a view like Fig. 25, showing the seal delivery in an intermediate position;

Fig. 27 is a view similar to Figs. 25 and 26 but with the seal delivery mechanism in its final seal positioning condition;

Fig. 28 is a section on the line 28—28 of Figs. 2 and 30;

Fig. 29 is a section on the line 29—29 of Fig. 28;

Fig. 30 is a section on the line 30—30 of Fig. 28;

Fig. 31 is a section on the line 31—31 of Fig. 4;

Fig. 32 is an enlarged fragmentary view of the seal-joint forming jaws at the completion of a joint;

Fig. 33 is a view similar to Figs. 31 and 32 with the sealing jaws open;

Fig. 34 is a view similar to Figs. 31, 32 and 33, showing the jaws and seal after pre-forming of seal around seal feed plunger;

Fig. 35 is a section on the line 35—35 of Fig. 25;

Fig. 36 is a section on the line 36—36 of Fig. 25; and

Fig. 37 is a graph or chart explanatory of the timing of the operations produced by single rotation of the cam shaft, i. e., of one cycle of the machine.

A typical bundle which is difficult tightly to bind is an annular roll or coil of metal strip or ribbon and because the herein disclosed machine serves admirably to accomplish this result, the invention will be described as adapted especially for binding such bundles. The binder material for which the machine is especially adapted to operate is a flexible metallic strap or ribbon.

The table or bench

The table or bench includes a top 1, which supports the bundle—here, for the purpose of illustration being an annular coil A of metallic strap or ribbon—in binding position, as shown most clearly in Fig. 1. The table or bench may be supported by suitable legs (not shown) or other appropriate framework at the most convenient height for the binding operator. And partly above and partly below an opening therein, it carries a binding unit within a housing 2, a motor 3 and suitable speed reduction mechanism in a casing 4. As most clearly shown, generally in Fig. 2, the binding unit housing 2 supports the gear reduction casing 4 and the motor 3. Projecting forwardly of the binder unit housing in locations readily accessible to the operator are a binder-strap feed control knob 5 whereby the operator may initiate and control the supplying of binder strap from a suitable source, such as a reel (not shown) up through the opening in the table top, and a binding-operation control knob 6 whereby the operator initiates the automatic cycling of the remainder of the operations necessary to complete the application of one permanent tensioned binder loop about the bundle. Knob 5 is biased to outward or idle position by a spring 7. Similarly knob 6 is biased to outward or idle position by a spring 8.

The various operations of a complete binding cycle and the mechanisms involved therein will be described, in general, in the order in which the several steps occur.

The strap feed

The binder-strap 10, which preferably feeds upwardly from a suitable source such as a reel below the table top, passes between a serrated driven feed roller 11 and a smooth surfaced presser roller 12. Feed roller 11 is mounted in a fixed position on a stud 13 and has a sprocket wheel 14 which is driven by a sprocket chain 15 meshing with a sprocket wheel 16, as shown most clearly in Figs. 4 and 15. Sprocket wheel 16 is keyed to a shaft 17 which rotates continuously while the motor is operating and may be considered the main drive shaft. As shown most clearly in Fig. 8, this main drive shaft 17 is connected to the projecting drive stud 18 of the speed reduction mechanism located within the casing 4.

The presser roller 12 is mounted freely to rotate upon a lever 25, as shown most clearly in Figs 1, 4 and 16. Lever 25 is pivotally attached at its lower end to the housing 2 upon a pin 26, while its upper end is adjustably connected to a rod 27 which carries knob 5 on its outer end. A leaf spring 28 bears upon the binder strap in advance of the feed wheel 11 and presses it rather lightly against the lower end of lever 25 to impart a slight drag upon the strap and prevent the strap dropping back when the loop is separated from it.

Although, after the power switch of the motor (not shown) has been closed, the strap-feed wheel 11 is continuously rotating in the direction indicated by the arrows (i. e., in a direction to feed the binder-strap from the source of supply up through the opening in the table top), still strap is not fed until the operator presses in on knob 5. Thereupon the presser roller 12 forces the binder-strap 10 against the rotating feed wheel 11 and strap continues to be fed until the operator releases the knob and permits spring 7 to retract the presser roller, whereupon feed ceases. Thus the feeding of strap is accomplished by the driving motor but the amount fed is controlled by the operator so that whatever amount is required to loop a given bundle may be supplied.

Strap guide

Opening through the front of the binder unit housing 2 is a chute 30 which has strap confining sides and a curved strap guiding bottom 31. After the binder-strap to the desired length for looping a given bundle has been fed up through the table, as previously explained, its free end is passed over the bundle, as indicated, for example, in Figs. 1, 4 and 25, inserted into chute 30 and pushed rearwardly therethrough over the curved chute bottom 31 to a position preferably slightly beyond the joint forming location where it is anchored preparatory to the slack retracting and tensioning step, as will now be described.

Strap-end anchorage

In order that the slack in the tensioned bundle encircling loop may be reduced to a minimum and to simplify the anchorage of the fixed binder end, I have arranged to press or grip the binder-strap end against the bundle. In this way the bundle being bound constitutes one of the strap end grippers whereby the strap end is anchored without the necessity of interposing a gripper between the strap and the bundle, and without subjecting the strap to transverse pressure which, particularly with thin strapping, may be objectionable.

Thus, preferring to grip the anchored end of the strap 10 against the bottom face of the bundle, I provide a gripper 35 which normally—i. e., when the machine is inactive—is retracted to leave an open channel for the passage of the end of the binder strap loop, but may be moved upwardly to press the strap end against the lower face of a bundle in binding position, and thereby anchor it in place against the subsequent loop-tensioning pull.

The action of gripper 35, together with other subsequently performed steps in the actual binding operation, are initiated by the operator pressing knob 6 inwardly against its biasing spring 7.

Gripper 35 is carried upon one arm 36 of a bell crank lever 37, the connection being adjustable by a pin and slot arrangement 38, contacting serrated faces 39, and a locking washer and screw 40, as shown most clearly in Figs. 6 and 7. Lever 37 is journaled upon a shaft 45 and its other arm 46 carries a cam roller or follower 47 which rides on the face of a cam 48. Cam 48 is keyed to a shaft 49, which, since it carries other operating and timing cams, may be conveniently termed the cam shaft. As shown most clearly in Fig. 16, when the cam roller 47 is at the low segment of cam 48, the gripper lever 37 and gripper 35 are in the retracted positions shown by the full lines; whereas when the rotation of shaft 49 brings the high region of cam 48 into contact with follower 47, the gripper lever 37 is rocked into the position shown by the dot-dash lines and gripper 35 is raised to push and clamp the strap end against the lower surface of the bundle as shown by the dotted lines. And this condition is maintained until after a joint has been made.

Drive of cam shaft

Referring particularly to Figs. 4, 5, 15, and 20 to 24, cam shaft 49 is rotated from drive shaft 17, making one complete revolution and thereby completing one cycle of the actual binding operations upon each depression of the binder control knob 6. The driving connection between the drive shaft and cam shaft is accomplished in this manner: Drive stud 18 has a pinion 55 fixed thereto to rotate therewith and this pinion meshes with a bull gear 56, which is loosely journaled on cam shaft 49. Bull gear 56 has a series of driving lugs 57 upon its inner face. Each of these lugs has a driving face and a beveled face as clearly shown. I have provided the bull gear with eight of these lugs. A cam wheel 58, which as will subsequently be explained, effects the retraction of binder strap and tensions the loop thereof about the bundle, is keyed to cam shaft 49. And this cam carries a latch which, under proper conditions may be engaged by and disengaged from any one of the lugs 57 on the bull gear 56. This latch comprises the lever 59 which is pivotally carried by cam 58 on a pin 60 and has its outer end biased outwardly into the path of drive lugs 57 by a spring 61. However, the latch 59 is normally held out of the path of drive lugs 57 against the bias of its spring. This is accomplished by a bevel faced plug 65 which lies in a socket 66 formed in the housing 2 and which is biased upwardly by a spring 67. This socket is closed by a threaded cap 68 which when in place forms an abutment for one end of spring 67 (the other end abutting plug 65) and when removed affords a ready means of inserting and removing the plug and its biasing spring and for draining lubricant. In order to prevent plug 65 from being hydraulically bound at the bottom of its socket, it may be provided with venting grooves 65a.

A pin 69, which passes through a slot 70 in the wall of socket 66, connects plug 65 to lever 71, the connection being through a slot 72 in this lever, as shown most clearly in Figs. 4, 5 and 15. Lever 71 is pivotally carried on stud shaft 13 and curves upwardly to lie against the inner end of a push rod 73 which carries knob 6 on its outer end.

Now with knob 6 in its normal outward position, the upper end of lever 71 is pushed to the left, as viewed in Figs. 4 and 15, by spring 67 with the result that, pivoting about shaft 13, its lower inner end is raised by spring 67 below plug 65 and thereby interposing plug 65 in the path of latch 59 so that the latch is withdrawn out of the path of the bull gear driving lugs 57. On the other hand when knob 6 is pushed in, it rocks lever 71 so as to depress plug 65 whereupon latch 59 is released and, by its biasing spring 61, forced out into the path of the driving lugs 57. The latch 59 is engaged by the abrupt driving face of the first lug to reach it and thereupon for a full revolution of the bull gear 56 cam shaft 49 is rotated. The operator having released knob 6, after initiating a cycle, and thereby permitting biasing spring 67 to rock lever 71 in a counterclockwise direction, causes the beveled plug 65 to be interposed in the path of latch 59 which is then rotating with cam wheel 58, causing cam shaft 49 to rotate. And when the bevel of plug 65 is struck by latch 59, it causes the latch to be moved inwardly and withdrawn from contact with the lug 57. The rotation of cam wheel 58 and with it the rotation of cam shaft 49 thereupon ceases at the end of one revolution when, as the operator should, the binding control knob 6 is released after being momentarily pushed in.

It will therefore be apparent that upon the operator momentarily pushing in binding control knob 6, the cam shaft 49 is driven for one revolution and then stops; and during that revolution it rotates gripper cam 48 with the result that the gripper 35 is first raised to clamp the free end of the binder-strap 10 against the surface of the bundle to anchor it and then there held in anchoring position until subsequently released after the bundle encircling tensioned loop has been made permanent by the joining of its overlapping ends.

In order to prevent overrunning of the cam shaft, shaft 49 is provided with an adjustable brake 80. As shown most clearly in Figs. 1, 7 and 15, this brake includes a brake drum 81 fixed to one end of cam shaft 49, and a brake band 82. Brake band 82 is fixed at both ends to housing 2 by means of a post 83. Its tightness and consequently the intensity of its braking action upon drum 81 may be varied by a spring biased link 84 and adjusting lock nuts 85.

Strap retraction and loop tensioning

After the binder-strap has been looped about the bundle, the slack is pulled back to shrink the loop tightly around the bundle. This is accomplished by a driven serrated-faced tensioning wheel 90 and a smooth faced idler presser wheel 91, the latter pressing the strap against the face of the former. Tensioning wheel 90 is mounted upon and fixed to one end of a stud shaft 92 as shown particularly in Fig. 9. Shaft 92 has a loose pinion 93 which meshes with the teeth on the arc of a gear segment 94 which is loosely journaled on shaft 45, as most clearly shown in Fig. 15. Gear segment 94 has formed thereon a bifurcated lug 95 between the ears of which a cam roller or follower 96 is carried on a pin 97. Follower 96 bears on the surface of tensioning cam 58 and is biased thereagainst by a spring 98. A rod 99 is attached at one end to housing 2 by an adjustable pivot stud 100 and its other end passes slidably through a rotatable post 101 journaled in the web of gear segment 94. Thus the tensioning cam follower 96 is always caused to follow the contour of tensioning cam 58 and when the segment 94 is rocked from the full line position to the dotted line position shown in Fig. 15—while the follower rides from the low to the high region of the cam during which the slack is retracted and the loop tensioned upon the bundle by the rotation of tensioning wheel 90 in a counterclockwise direction—energy is stored up in spring 98 to effect the return of the gear segment and the tensioning wheel 90 driven thereby back to starting position.

Adjustment of tension

Referring particularly to Figs. 6, 10, 11, 12 and 15, a disc clutch 110 having some of its plates secured to pinion 93 and alternate plates notched to receive a series of screw pins 111, serves to limit the amount of tension under which the binder strap may be shrunk upon the package. Pins 111 thread into a disc 112 which rotates with shaft 92 and each is provided with a surrounding spring 113. These springs abut at one end against a disc 114 and at the other end they abut a disc 115 which lies against the heads of screws 111. Thus by turning screws 111 in one direction or the other, the disc 115 may be caused to approach or recede from disc 114 thereby increasing or decreasing the spring tension and correspondingly increasing or decreasing the friction between the clutch plates and raising or lowering the maximum tension that can be exerted upon the binder strap by the tensioning wheel.

Gripping of binder-strap against tensioning wheel

As previously mentioned, the retraction and tensioning of the binder-strap about the bundle is accomplished by the presser wheel 91 pressing the strap against the periphery of the tensioning wheel, while the latter wheel is being rotated in a counterclockwise direction as viewed in Fig. 16. The necessary movement of presser wheel 91 toward tensioning wheel 90 is provided by mounting the presser wheel to rotate upon the eccentric end 120 of a stud shaft 121 as shown most clearly in Fig. 6. Shaft 121 is journaled for rotation in a bearing formed in housing 2 and it is rotated through a fixed arc of movement by the gripper cam 48. Thus the outer end of the gripper lever arm 36 has one end of a link 122 pivotally connected thereto, the other end of the link being pivotally connected to the outer end of a lever 123 which is adjustably fixed to stud shaft 121. Consequently when cam 48 causes bell crank lever 37 to rock to raise gripper 35 into strap anchoring position, as previously explained, it also causes stud shaft 121 to be rotated at the same time through the arc indicated by the dot-dash line and the dash line positions of lever 123 in Fig. 16. And because of the mounting of tensioning pressure wheel 91 upon the outer eccentric end 120 of shaft 121, this rotation of shaft 121 causes the tensioning pressure wheel to approach the driven tensioning wheel 90. Movement of the bell crank lever 37 in the opposite direction causes the tensioning presser wheel to be moved away from the tensioning wheel and the retracting pull upon the strap ceases because the strap is no longer held against the driven tensioning wheel. The angular relation between lever 123 and the eccentric portion 120 of stud shaft 121 can be adjusted so as to alter the amount by which the presser wheel moves toward the driven tensioning wheel in order to compensate for different thicknesses of binder-strap and thereby always insure the requisite firm contact between the strap and the driven tensioning wheel. The desired adjustment is made possible by interposing an eccentric bushing 124 between the end 120 of shaft 121 and presser roller 91 and it may be retained by a lock nut 125.

Sealing the binder loop

Upon the completion of the binder loop tensioning operation, the overlapping ends of the loop are joined to make it a permanent binder. Preferably the joint is reinforced by a small metal seal which, together with a region of the overlapping loop ends, are deformed to create a tension resisting seal-joint.

The strap ends and seal are deformed or crimped to form the seal-joint by a pair of plier-like jaws 130 pivoted upon a stationary stud 131 mounted in the top cover of housing 2. The jaws are operated by a sliding crosshead 132 which is actuated by a sealer cam 133 which is keyed to cam shaft 49. A bell crank lever 134 is pivoted to housing 2 on a stud 135 (see particularly Figs. 4 and 18) and carries at the end of one arm a cam roller or follower 136 which bears on sealer cam 133. The other arm of lever 134 has a link 137 pivoted to its outer end. A pair of links 138 are connected at one end to crosshead 132 by a common pivot pin 139. The other end of the links 138 are pivoted to the outer end of jaws 130 by pins 140. A rod 141 connected at one end to housing 2 by a universal joint 142 and slidably passing through a post 145 on lever 134 supports a biasing spring 146. One end of spring 146 abuts against housing 2 and the other end abuts post 145 so that the sealer bell crank lever 134 is always biased to retain its follower 136 in contact with sealer cam 133, to retract crosshead 132 and open jaws 130.

Normally or when idle the relation of cam 133 and its follower 136 is such that the jaws are partly open to retain a seal between them. However, as shaft 49 rotates further and follower 136 rides toward the higher region of cam 133, crosshead 132 is advanced to cause the jaws to close about the overlapping strap ends and seal to deform them into a tension resisting seal-joint.

Seal magazine

The seals which are used to reinforce the joints between the overlapping ends of the bundle looping binder strap are stored in quantity in a magazine at the top of the housing 2. It includes a trough 150 which, for the sake of compactness and easy feeding, is in the main formed in a circle as shown most clearly in Fig. 13. The seals, which initially are of substantially channel shape, are placed in the trough on end and in closely nested relation to form in effect a stack. The rearmost seal of the stack is engaged by a pusher head 151 which is pivotally connected at 152 to a guide block 153. A link 154 is pivotally connected to the other end of guide block 153 and to an arm 155. The inner end of arm 155 is pivoted on a post 156 which is located at the center of the partial circle defined by seal trough 150. A helical spring 157 lies in an annular recess 158 in the top of housing 2. This spring has its inner end connected to a post 159 fixed to the housing and its outer end to arm 155 at 160. Thus the seals in the magazine are always urged toward the delivery end of its storage trough and, as will be now explained, are fed one at a time to the joint location between the sealing jaws 130.

Seal feed

Referring particularly to Figs. 26, 27, 28 and 29, the forwardmost seal at the delivery end of the magazine trough 150 is in the path of a seal ejector lug 165 which is connected by a pin 166 to a plunger 167 which, as will be later explained, acts with the sealing jaws to preliminarily form the seal to receive the binder strap. Plunger 167 is connected by a bolt 168 to a crosshead 169. The connection between the crosshead and seal feeding plunger is made slightly loose so as to permit a predetermined tilt to the plunger to enable its lower end to clear an anvil 170 which cooperates with the jaws to form the seal-joint. This play is accomplished by providing crosshead 169 with a cylindrical recess 171 for accommodating a spring 172. Spring 172 abuts at one end against the bottom of recess 171 and at the other end against the nut 173. Nut 173 serves to adjust the amount the plunger 167 may tilt.

Crosshead 169 is, by means of a seal feed cam 180, reciprocated up and down to bring the seal pusher lug 165 above the top edge of the first seal at the delivery end of the magazine and to push that seal down into position where it may be acted upon by the jaws.

Seal feed cam 180 is keyed to cam shaft 49. Its roller or follower 181 is carried by one end of an arm 182 of a bell crank lever 183. Lever 183 is journaled upon shaft 45 and its other arm 184, is forked to straddle the cylindrical portion 185 of a yoke 186. A pair of threaded rods 187 pass through opposite ends of yoke 186 and each has a nut 188 at its lower end abutting yoke 186. Each rod 187 has a plunger 195 secured to its upper end and is surrounded by a spring 196. Springs 196, which encircle rods 187 abut plungers 195 at their upper ends and plugs 197 at their lower ends. Plugs 197 slidably accommodate rods 187 and are externally threaded to receive the internal threads of tubes 198. Tubes 198 are closed at their upper ends by plugs 199 which are secured in place by cross pins 200, as most clearly shown in Fig. 30. Plugs 199 are provided with threaded studs 205 which pass through cross-head 169. Nuts 206, which thread upon studs 205 and bear against the crosshead 169 lock the crosshead to tubes 198. Thus there is provided a resilient connection between the cam actuated seal feed bell crank lever 184 and the crosshead by which the seal feeding plunger 167 is carried.

Now as the seal feed cam follower rides toward the high side of the seal feed cam 180, bell crank lever 183 is rocked in a counterclockwise direction as viewed in Fig. 18 to lower crosshead 186. The downward movement of crosshead 186, through the resilient connection just described, results in crosshead 169 being moved downward to cause plunger 167 to move downward. The downward movement of plunger 167 causes the seal feeding push lug 165 to engage the upper edge of the first seal at the delivery end of the seal storage magazine and carry that seal down until eventually the lower edge of the seal strikes a shoulder 207 on anvil 170. The relation then existing between the sealing jaws, the plunger 167 and the anvil 170 is shown in Fig. 33.

After the seal is positioned with its lower edge against stop 207, the sealing jaws are moved inwardly to some extent to pre-form the seal about the plunger 167 as shown most clearly in Fig. 34. In this way the seal, the flanges of which originally were fully open, as shown in Fig. 33, are closed together sufficiently to retain a binder strap which is threaded through the seal between them as shown in Fig. 31.

Binder cutoff

Almost at the completion of the formation of the seal-joint, the binder loop about the bundle is severed from the source of binder-strap supply. This is accomplished through the action of the same cam that operates the seal forming jaws. Thus the sealer crosshead 132 is connected by link pivot pin 139 to a cutter crosshead 210. Crosshead 210 slides in guides formed by slots in the housing and cap screw retaining plates 211 as shown most clearly in Figs. 35 and 36. Crosshead 210 carries a cutter blade 212. In order that the blade may be removed for replacement, it is detachably secured to crosshead 210 by screws 213.

When, therefore, the sealer cam has almost completely closed the sealing jaws to form the joint, the strap cutter 210 comes into play and cuts the strap close to the bottom edge of the seal.

Moving bundle from binding position

During the placement of a seal into sealing position, as previously described, the bound bundle is moved from sealing position so as not to interfere with the placement of a seal for the next binding operation. Referring particularly to Figs. 3, 30 and 31, this movement of the bundle is accomplished by two bundle moving levers 220 which are carried upon pivot pins 221 having suitable bearings in housing 2. The upper ends of levers 220 have inclined or beveled cam surfaces 222 which are adapted to be engaged by a corresponding cam surface 223 on crosshead 169. Thus when crosshead 169 is depressed to feed a seal into sealing position, the co-action of its cam surface 223 against the corresponding cam surfaces 222 of levers 220 causes those levers to be rocked about their pivots 221 to move the bound bundle away from binding position, i. e., to the left as viewed in Fig. 30. In this way the bundle is moved away so that it does not interfere with the placement of the seal for the next binder to be applied. The resilient connection between seal feed bell crank lever 184 and crosshead 169, which was previously described, prevents undue strain upon the cam mechanism in the event heavy bundles are being bound, because the energy required for moving the bundle is gradually accumulated by the action of the spring 196. It also prevents damage in the event the seal feeding mechanism becomes jammed.

Summary of operation

In order to condition the machine for binding bundles, it is first permitted to go through a complete cycle of operations without, however, a bundle being in position or the binder strap having been fed to provide a length necessary to encircle a bundle. Thus the operator closes the switch to motor 3, whereupon the main drive shaft 17 and bull gear 56 start to revolve; and they continue to revolve until the motor circuit is open. The operator then presses control knob 6 permitting the machine to cycle idly. That is, without actually binding a bundle. This idle cycling of the machine has only the result that a seal is ejected from the magazine down into sealing position and there partly formed, so that when strap is threaded therethrough, it will be retained therein, as shown in Fig. 31.

The operator now places the bundle in binding position and, assuming that the binder strap has been threaded up between the feed wheels 11—12 and the tensioning wheels 90—91 to the point where its free end is between the open jaws, he presses feed knob 5. The depression of this knob causes presser roller 12 to press the binder-strap against the rotating feed wheel 11 whereupon strap is withdrawn from the source of supply and fed upwardly between the tensioning rollers and through the positioned seal until there is enough available to loop the package. Feeding of strap is stopped when the operator releases knob 5. The operator then loops the strap about the bundle, inserts the free end of the strap into the guiding trough and pushes it through until it overlaps the strap from the source and passes through the seal and slightly beyond. The first stop in an actual binding cycle is now completed and the loop is prepared for tensioning.

The operator now presses in control knob 6, which initiates the automatic performance of all of the remaining steps in the bundle binding cycle.

First the gripper 35 is moved up to press the strap near its free end against the lower surface of the bundle. And as soon as the strap is initially thus gripped, the tensioning presser wheel 91 presses the strap against the tensioning wheel 90. And since wheel 90 then begins to rotate in a direction reverse to that in which feed wheel 12 rotated, the excess strap in the loop about the bundle is pulled back and the loop is shrunk upon and tensioned about the bundle. In this operation the binder loop, as it is shrunk upon the bundle, exerts a force thereon in opposition to the upward pressure of gripper 35 so that the effectiveness of the anchorage of the strap against the back pull of the tensioning wheel is in no wise dependent upon the weight of the bundle. As previously explained, overtensioning is prevented by the tension limiting clutch 110.

The tensioning step having been completed, the sealing cam starts further to close the sealing jaws so as to crimp together into a seal joint the seal which is lying between them and the overlapping strap ends which lie within the seal. Almost at the completion of a sealing operation, the sealing cam has moved the cutter forward and the strap looped about the package is severed from the source of supply just below the seal.

After the sealing operation has been completed, the continued rotation of the sealing cam retracts the cutter and opens the sealing jaws.

When the sealing jaws have been completely opened, the seal feed cam starts to rock bell crank lever 184 with the result that the bound bundle is first moved away from binding position to clear a path for the next seal and the next seal from the magazine is ejected and moved down into position between the jaws. When the seal for the next binding operation is in position, the sealing cam partly closes the sealing jaws so as to pre-form that seal about the forming plunger to condition it for receiving the binder ends of the next binding loop. Further rotation of the seal feed cam retracts the ejecting and forming plunger so that the seal is then left open for the reception of the binder of the next bundle. The machine then automatically comes to rest ready to start another binding operation.

While I have illustrated and described a preferred embodiment of my invention, many modifications may be made without departing from the spirit of the invention and I do not wish to be limited to the precise details set forth but desire to avail myself of all changes within the scope of the appended claims.

Having thus described my invention, what I claim as new and desire to secure by Letters Patent of the United States is:

1. A bundle-binding machine comprising a support for holding a bundle in binding position; means for feeding binder forward from a source of binder supply to the binding position to enable the operator to loop it about the bundle; means for guiding the free end of the binder to a sealing position lapping the binder from the source; a gripper for pressing the binder near its free end against the bundle to cause said end to be anchored; tensioning means for retracting the binder to shrink and tension the loop thereof upon the bundle; sealing means for deforming the lapping portions of binder to form joint therebetween to render the tensioned loop permanent; a cutter for severing the binder between the loop about the bundle and the source of supply; a series of cams, one for actuating the gripper, a second for actuating the tensioning means, and a third for actuating the sealing means and cutter; operative connections between the several cams and respectively the gripper, the tensioning means, and the sealing means and cutter; a motor; and a common driving connection between the motor and the cams.

2. A bundle-binding machine comprising a support for holding a bundle in binding position; means for feeding binder forward from a source of binder supply to the binding position to enable the operator to loop it about the bundle, said means including a driven feed roller, a presser feed roller for pressing the binder against the feed roller whereby the feed roller moves the binder forward, and means actuated by the operator for moving the presser feed roller toward the feed roller; means for guiding the free end of the binder to a sealing position lapping the binder from the source; a gripper for pressing the binder near its free end against the bundle to cause said end to be anchored; tensioning means for retracting the binder to shrink and tension the loop thereof upon the bundle, said tensioning means including a driven tension roller and a presser tensioning roller for pressing the binder against the tensioning roller whereby the tensioning roller moves the binder in a direction reverse to feeding; sealing means for deforming the lapping portions of binder to form a joint therebetween to render the tensioned loop permanent; a cutter for severing the binder between the loop about the bundle and the source of supply; a series of cams, one for actuating the gripper and moving the tensioning presser roller against the driven tensioning roller, a second for driving the tensioning roller, and a third for actuating the sealing means and cutter; operative connections between the several cams and respectively the gripper and the tensioning presser roller, the driven tensioning roller, and the sealing means and cutter; a motor; a driving connection between the motor and the driven feed roller; and another driving connection between the motor and the cams.

3. A bundle-binding machine comprising a support for holding a bundle in binding position; means for feeding binder forward from a source of binder supply to the binding position to enable the operator to loop it about the bundle; means for guiding the free end of the binder to a sealing position where lapping portions of the bundle looping binder and a seal are deformed together to render the loop permanent; a gripper for pressing the binder near its free end against the bundle to cause said end to be anchored from retrograde movement; tensioning means for retracting the binder to shrink and tension the loop thereof upon the bundle; sealing means for deforming the lapping portions of the binder loop and seal to form a seal-joint therebetween and thereby render the loop permanent; a cutter for severing the binder between the loop about the bundle and the source of supply; a seal storage magazine; a seal delivery mechanism for transferring a seal from the magazine to a position to receive lapping portions of the binder and be acted upon by the sealing means; a series of cam mechanisms, one for actuating the gripper, a second for actuating the tension means, a third for actuating the sealing means and cutter, and a fourth for actuating the seal delivery mechanism; a motor; a common drive for all of the cam mechanisms; a manual control for interconnecting the motor and common drive; and means for automatically disconnecting the motor and common drive at the end of one cam revolution.

4. A bundle-binding machine comprising a support for holding a bundle in binding position; means for feeding binder forward from a source of binder supply to the binding position to enable the operator to loop it about the bundle; means for guiding the free end of the binder to a sealing position where lapping portions of the bundle looping binder and a seal are deformed together to render the loop permanent; a gripper for pressing the binder near its free end against the bundle to cause said end to be anchored from retrograde movement; tensioning means for retracting the binder to shrink and tension the loop thereof upon the bundle; sealing means for deforming the lapping portions of the binder loop and seal to form a seal-joint therebetween and thereby render the loop permanent; a cutter for severing the binder between the loop about the bundle and the source of supply; a seal storage magazine; a seal delivery mechanism for transferring a seal from the magazine to a position to receive lapping portions of the binder and be acted upon by the sealing means; a bundle moving mechanism for pushing the bundle out of binding position to prevent interference thereof with the delivery of a seal for the succeeding binding operation; a series of cam mechanisms, one for actuating the gripper, a second for actuating the tensioning means, a third for actuating the sealing means and cutter, and a fourth for actuating the seal delivery and bundle moving mechanisms; a motor; and a common driving connection between the motor and the several cam mechanisms.

5. A bundle-binding machine comprising a support for a bundle in binding position; means for feeding binder forward from a source of binder supply to the binding position to enable the operator to loop it about the bundle; a motor for driving the feeding means; binder feed control means actuated by the operator to render the feeding means effective and ineffective to feed the binder; means for guiding the free end of the binder to a sealing position underlapping the binder from the source; a gripper for pressing the binder near its free end against the bundle to initiate anchorage of said free end against retrograde movement; tensioning means for retracting the excess binder in the bundle encircling loop to tension the loop upon the bundle; sealing means for deforming the lapping portions of the binder loop to make a joint therebetween to render the loop permanent; a cutter for severing the binder near the joint and between the joint and the source of binder supply; a series of cams, one for actuating the gripper and rendering the tensioning means effective, a second for actuating the tensioning means, and a third for actuating the sealing means and cutter; operative connections between the several cams and respectively the gripper and the means for rendering the tensioning means effective, the tensioning means, and the sealing means and cutter; a cam shaft common to and driving all of the cams; a clutch between the motor and the cam shaft; a manual control for conditioning the clutch to connect the motor to the cam shaft; and a disconnect for the clutch acting at the completion of one revolution of the cam shaft to disconnect the cam shaft from the motor.

6. A bundle-binding machine comprising a support for a bundle in binding position; means for feeding binder forward from a source of binder supply to the binding position to enable the operator to loop it about the bundle; a motor for driving the feeding means; binder feed control means actuated by the operator to render the feeding means effective and ineffective to feed the binder; means for guiding the free end of the binder to a sealing position underlapping the binder from the source; a gripper for pressing the binder near its free end against the bundle to initiate anchorage of said free end against retrograde movement; tensioning means for retracting the excess binder in the bundle encircling loop to tension the loop upon the bundle; sealing means for deforming the lapping portions of the binder loop to make a joint therebetween to render the loop permanent; a cutter for severing the binder near the joint and between the joint and the source of binder supply; a seal storage magazine; a seal delivery mechanism for transferring a seal from the magazine to a position to receive in lapping relation binder from the source of supply and also the free end from the guide and there be acted upon by the sealing means to be deformed with lapping portions of the binder loop to form a seal-joint for the loop; a series of cam mechanisms, one for actuating the gripper, a second for rendering the tensioning means effective to retract binder to tension the loop upon the bundle; a third for actuating the sealing means and cutter and a fourth for actuating the seal delivery mechanism; a clutch for connecting all of the cam mechanisms to the motor; manual means for rendering the clutch effective; and an automatic disconnect for the clutch operable at the end of a cycle of operations of the cam mechanisms.

7. A bundle-binding machine comprising a support for a bundle in binding position; means for feeding binder forward from a source of binder supply to the binding position to enable the operator to loop it about the bundle; a motor for driving the feeding means; binder feed control means actuated by the operator to render the feeding means effective and ineffective to feed the binder; means for guiding the free end of the binder to a sealing position underlapping the binder from the source; a gripper for pressing the binder near its free end against the bundle to initiate anchorage of said free end against retrograde movement; tensioning means for retracting the excess binder in the bundle encircling loop to tension the loop upon the bundle; sealing means for deforming the lapping portions of the binder loop to make a joint therebetween to render the loop permanent; a cutter for severing the binder near the joint and between the joint and the source of binder supply; a seal storage magazine having a seal delivery end; means for moving seals in the magazine to the delivery end thereof; a seal delivery mechanism for transferring a seal from the delivery end of the magazine to a position to receive in lapping relation binder from the source of supply and also the free end from the guide and there be acted upon by the sealing means, said delivery mechanism including a seal pre-forming plunger which advances and lies within a seal during the delivery thereof; cam mechanism for actuating the seal delivery mechanism first to advance and then retract the pre-forming plunger; cam mechanism for actuating the sealing means first to press a seal upon the pre-forming plunger partly to close the seal so that binder from the source and the free end may be threaded therethrough to lap therein and finally after the loop has been tensioned to deform the seal and lapping binder to make a seal-joint in the loop and also for actuating the cutter; cam mechanism for actuating the gripper to initiate anchorage of the free end of the binder; a cam for rendering the tensioning means effective to retract binder to tension the loop upon the bundle; a common drive shaft for all of the cams; and means for connecting and disconnecting the cam drive shaft of the motor.

8. A bundle-binding machine comprising a support for a bundle in binding position; means for feeding binder forward from a source of binder supply to the binding position to enable the operator to loop it about the bundle; a motor for driving the feeding means; binder feed control means actuated by the operator to render the feeding means effective and ineffective to feed the binder; means for guiding the free end of the binder to a sealing position underlapping the binder from the source; a gripper for pressing the binder near its free end against the bundle to initiate anchorage of said free end against retrograde movement; tensioning means for retracting the excess binder in the bundle encircling loop to tension the loop upon the bundle; sealing means for deforming the lapping portions of the binder loop to make a joint therebetween to render the loop permanent; a cutter for severing the binder near the joint and betwen the joint and the source of binder supply; a seal storage magazine having a seal delivery end; means for moving seals in the magazine toward the delivery end thereof; a seal delivery mechanism for transferring a seal from the delivery end of the magazine to a position to receive in lapping relation binder from the source of supply and also the free end from the guide and there be acted upon by the sealing means; said delivery mechanism including a seal pre-forming plunger which advances and lies within a seal during the delivery thereof; a bundle moving mechanism for pushing the bundle out of binding position to prevent interference thereof with the delivery of a seal; cam mechanism for actuating the seal delivery mechanism and also the bundle moving mechanism first to move the bundle, then to advance and finally to retract the pre-forming plunger; cam mechanism for actuating the sealing means first to press a seal upon the pre-forming plunger partly to close a seal for the reception and retention in lapping relation of binder from the source and the free end of the binder and finally after the loop has been tensioned to deform the seal and lapping binder portions to make a seal-joint in the loop and also for actuating the cutter; cam mechanism for actuating the gripper to initiate anchorage of the free end of the binder; a cam for rendering the tensioning means effective to retract binder to tension the loop upon the bundle; a common drive shaft for all of the cams; and means for connecting and disconnecting the common cam drive shaft and the motor.

9. A bundle-binding machine comprising a support for a bundle in binding position; means for feeding binder forward from a source of binder supply to the binding position to enable the operator to loop it about the bundle; a motor for driving the feeding means; binder feed control means actuated by the operator to render the feeding means effective and ineffective to feed the binder; means for guiding the free end of the binder to a sealing position underlapping the binder from the source; a gripper for pressing the binder near its free end against the bundle to initiate anchorage of said free end against retrograde movement; tensioning means for retracting the excess binder in the bundle encircling loop to tension the loop upon the bundle; sealing means for deforming the lapping portions of the binder loop to make a joint therebetween to render the loop permanent; a cutter for severing the binder near the joint and between the joint and the source of binder supply; a seal storage magazine having a seal delivery end; means for moving seals in the magazine toward the delivery end thereof; a seal delivery mechanism for transferring a seal from the delivery end of the magazine to a position to receive in lapping relation binder from the source of supply and also the free end from the guide and there be acted upon by the sealing means; said delivery mechanism including a seal pre-forming plunger which advances and lies within a seal during the delivery thereof; a bundle moving mechanism for pushing the bundle out of binding position to prevent interference thereof with the delivery of a seal; cam mechanism for actuating the seal delivery mechanism and also the bundle moving mechanism first to move the bundle, then to advance and finally to retract the pre-forming plunger; said seal delivery mechanism including a resilient connection for communicating motion from the cam to the bundle moving mechanism; cam mechanism for actuating the sealing means first to press a seal upon the pre-forming plunger partly to close a seal for the reception and retention in lapping relation of binder from the source and the free end of the binder and finally after the loop has been tensioned to deform the seal and lapping binder portions to make a seal-joint in the loop and also for actuating the cutter; cam mechanism for actuating the gripper to initiate anchorage of the free end of the binder; a cam for rendering the tensioning means effective to retract binder to tension the loop upon the bundle; a common drive shaft for all of the cams; and means for connecting and disconnecting the common cam drive shaft and the motor.

10. A bundle-binding machine comprising a support for a bundle in binding position; means for feeding binder forward from a source of binder supply to the binding position to enable the operator to loop it about the bundle; a motor for driving the feeding means; binder feed control means actuated by the operator to render the feeding means effective and ineffective to feed the binder; means for guiding the free end of the binder to a sealing position underlapping the binder from the source; a gripper for pressing the binder near its free end against the bundle to initiate anchorage of said free end against retrograde movement; tensioning means for retracting the excess binder in the bundle encircling loop to tension the loop upon the bundle; sealing means for deforming the lapping portions of the binder loop to make a joint therebetween to render the loop permanent; a cutter for severing the binder near the joint and between the joint and the source of binder supply; a seal storage magazine having a seal delivery end; means for moving seals in the magazine toward the delivery end thereof; a seal delivery mechanism for transferring a seal from the delivery end of the magazine to a position to receive in lapping relation binder from the source of supply and also the free end from the guide and there be acted upon by the sealing means; said delivery mechanism including a seal pre-forming plunger which advances and lies within a seal during the delivery thereof; a bundle moving mechanism for pushing the bundle out of binding position to prevent interference thereof with the delivery of a seal; cam mechanism for actuating the seal delivery mechanism and also the bundle moving mechanism first to move the bundle, then to advance and finally to retract the pre-forming plunger; said seal delivery mechanism including a resilient connection for communicating motion from the cam to the bundle moving mechanism; cam mechanism for actuating the sealing means first to press a seal upon the pre-forming plunger partly to close a seal for the reception and retention in lapping relation of binder from the source and the free end of the binder and finally after the loop has been tensioned to deform the seal and lapping binder portions to make a seal-joint in the loop and also for actuating the cutter; cam mechanism for actuating the gripper to initiate anchorage of the free end of the binder; a cam for rendering the tensioning means effective to retract binder to tension the loop upon the bundle; a common drive shaft for all of the cams; a clutch for connecting and disconnecting the common cam shaft to the motor including a latch which may be moved into driving relation under manual control and is automatically moved out of driving relation at the end of one revolution of the cam shaft.

PAUL A. CHAMBERLAIN.

REFERENCES CITED

The following references are of record in the file of this patent:

UNITED STATES PATENTS

| Number | Name | Date |
|---|---|---|
| 1,999,144 | Spoor | Apr. 23, 1935 |
| 2,002,596 | Graham | Nov. 26, 1935 |
| 2,285,120 | Marchev | June 2, 1942 |
| 2,409,652 | Workman | Oct. 22, 1946 |

Certificate of Correction

Patent No. 2,438,386.

March 23, 1948.

PAUL A. CHAMBERLAIN

It is hereby certified that errors appear in the printed specification of the above numbered patent requiring correction as follows: Column 12, line 29, claim 2, and line 75, claim 3, for the word "tension" read *tensioning*; and that the said Letters Patent should be read with these corrections therein that the same may conform to the record of the case in the Patent Office.

Signed and sealed this 25th day of May, A. D. 1948.

[SEAL]

THOMAS F. MURPHY,
*Assistant Commissioner of Patents.* binder from the source of supply and also the free end from the guide and there be acted upon by the sealing means; said delivery mechanism including a seal pre-forming plunger which advances and lies within a seal during the delivery thereof; a bundle moving mechanism for pushing the bundle out of binding position to prevent interference thereof with the delivery of a seal; cam mechanism for actuating the seal delivery mechanism and also the bundle moving mechanism first to move the bundle, then to advance and finally to retract the pre-forming plunger; said seal delivery mechanism including a resilient connection for communicating motion from the cam to the bundle moving mechanism; cam mechanism for actuating the sealing means first to press a seal upon the pre-forming plunger partly to close a seal for the reception and retention in lapping relation of binder from the source and the free end of the binder and finally after the loop has been tensioned to deform the seal and lapping binder portions to make a seal-joint in the loop and also for actuating the cutter; cam mechanism for actuating the gripper to initiate anchorage of the free end of the binder; a cam for rendering the tensioning means effective to retract binder to tension the loop upon the bundle; a common drive shaft for all of the cams; a clutch for connecting and disconnecting the common cam shaft to the motor including a latch which may be moved into driving relation under manual control and is automatically moved out of driving relation at the end of one revolution of the cam shaft.

PAUL A. CHAMBERLAIN.

REFERENCES CITED

The following references are of record in the file of this patent:

UNITED STATES PATENTS

| Number | Name | Date |
|---|---|---|
| 1,999,144 | Spoor | Apr. 23, 1935 |
| 2,002,596 | Graham | Nov. 26, 1935 |
| 2,285,120 | Marchev | June 2, 1942 |
| 2,409,652 | Workman | Oct. 22, 1946 |

Certificate of Correction

Patent No. 2,438,386.

March 23, 1948.

PAUL A. CHAMBERLAIN

It is hereby certified that errors appear in the printed specification of the above numbered patent requiring correction as follows: Column 12, line 29, claim 2, and line 75, claim 3, for the word "tension" read *tensioning*; and that the said Letters Patent should be read with these corrections therein that the same may conform to the record of the case in the Patent Office.

Signed and sealed this 25th day of May, A. D. 1948.

[SEAL]

THOMAS F. MURPHY,
*Assistant Commissioner of Patents.*